(12) United States Patent
Kim et al.

(10) Patent No.: US 11,848,572 B2
(45) Date of Patent: Dec. 19, 2023

(54) WIRELESS POWER RECEPTION APPARATUS, WIRELESS POWER TRANSMISSION APPARATUS, AND FOREIGN MATTER DETECTION METHOD USING SAME

(71) Applicant: LG ELECTRONICS INC., Seoul (KR)

(72) Inventors: Kyunghwan Kim, Seoul (KR); Gyunghwan Yook, Seoul (KR); Hyoungseok Kim, Seoul (KR); Hwanyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 17/597,790

(22) PCT Filed: Jul. 27, 2020

(86) PCT No.: PCT/KR2020/009849
§ 371 (c)(1),
(2) Date: Jan. 24, 2022

(87) PCT Pub. No.: WO2021/020833
PCT Pub. Date: Feb. 4, 2021

(65) Prior Publication Data
US 2022/0247230 A1 Aug. 4, 2022

(30) Foreign Application Priority Data
Jul. 26, 2019 (KR) .................. 10-2019-0090869

(51) Int. Cl.
*H02J 50/60* (2016.01)
*H02J 50/12* (2016.01)
(Continued)

(52) U.S. Cl.
CPC .............. *H02J 50/60* (2016.02); *H02J 50/12* (2016.02); *H02J 50/20* (2016.02); *H02J 50/80* (2016.02)

(58) Field of Classification Search
CPC .. H02J 50/05; H02J 50/10; H02J 50/12; H02J 50/20; H02J 50/40; H02J 50/402; H02J 50/60; H02J 50/80
See application file for complete search history.

(56) References Cited

U.S. PATENT DOCUMENTS

2013/0076153 A1* 3/2013 Murayama .............. H02J 50/60
307/104
2013/0134792 A1* 5/2013 Bunsen .................... H02J 50/12
324/633
(Continued)

FOREIGN PATENT DOCUMENTS

JP 2014187795 10/2014
KR 10-2018-0003810 A * 1/2018 ........... H04B 5/0037
(Continued)

OTHER PUBLICATIONS

PCT International Application No. PCT/KR2020/009849, International Search Report dated Oct. 29, 2020, 5 pages.

*Primary Examiner* — Levi Gannon
(74) *Attorney, Agent, or Firm* — LEE HONG DEGERMAN KANG WAIMEY

(57) ABSTRACT

A wireless power reception apparatus according to an embodiment of the present specification comprises: a power pickup circuit for receiving, by magnetic coupling to a wireless power transmission apparatus, wireless power from the wireless power transmission apparatus; and a communication/control circuit for communicating with the wireless power transmission apparatus and controlling the received wireless power, wherein the communication/control circuit transmits, before entering a power transmission phase, to the
(Continued)

wireless power transmission apparatus, information regarding a first reference quality factor $Qt1'(ref)$ measured at a first frequency $f1(ref)$ and information regarding a second reference quality factor $Qt2'(ref)$ measured at a second frequency $f2(ref)$.

6 Claims, 29 Drawing Sheets

(51) Int. Cl.
  *H02J 50/80* (2016.01)
  *H02J 50/20* (2016.01)

(56) References Cited

U.S. PATENT DOCUMENTS

| | | | |
|---|---|---|---|
| 2014/0084857 A1* | 3/2014 | Liu | H02J 50/402 |
| | | | 320/108 |
| 2016/0164302 A1* | 6/2016 | Nakano | H02J 9/00 |
| | | | 307/104 |
| 2018/0115197 A1* | 4/2018 | Li | H02J 50/60 |
| 2023/0063867 A1* | 3/2023 | Shichino | H02J 7/00 |

FOREIGN PATENT DOCUMENTS

| | | |
|---|---|---|
| KR | 20180009294 | 1/2018 |
| KR | 20190050301 | 5/2019 |
| KR | 20190082891 | 7/2019 |
| WO | 2017086804 | 5/2017 |

\* cited by examiner

FIG. 3b

|  | b7 | b6 | b5 | b4 | b3 | b2 | b1 | b0 |
|---|---|---|---|---|---|---|---|---|
| Byte 0 | Application Profile |||||||||
| Byte 1 | Version ||||||||
| Byte 2-N-1 | Profile-specific data ||||||||

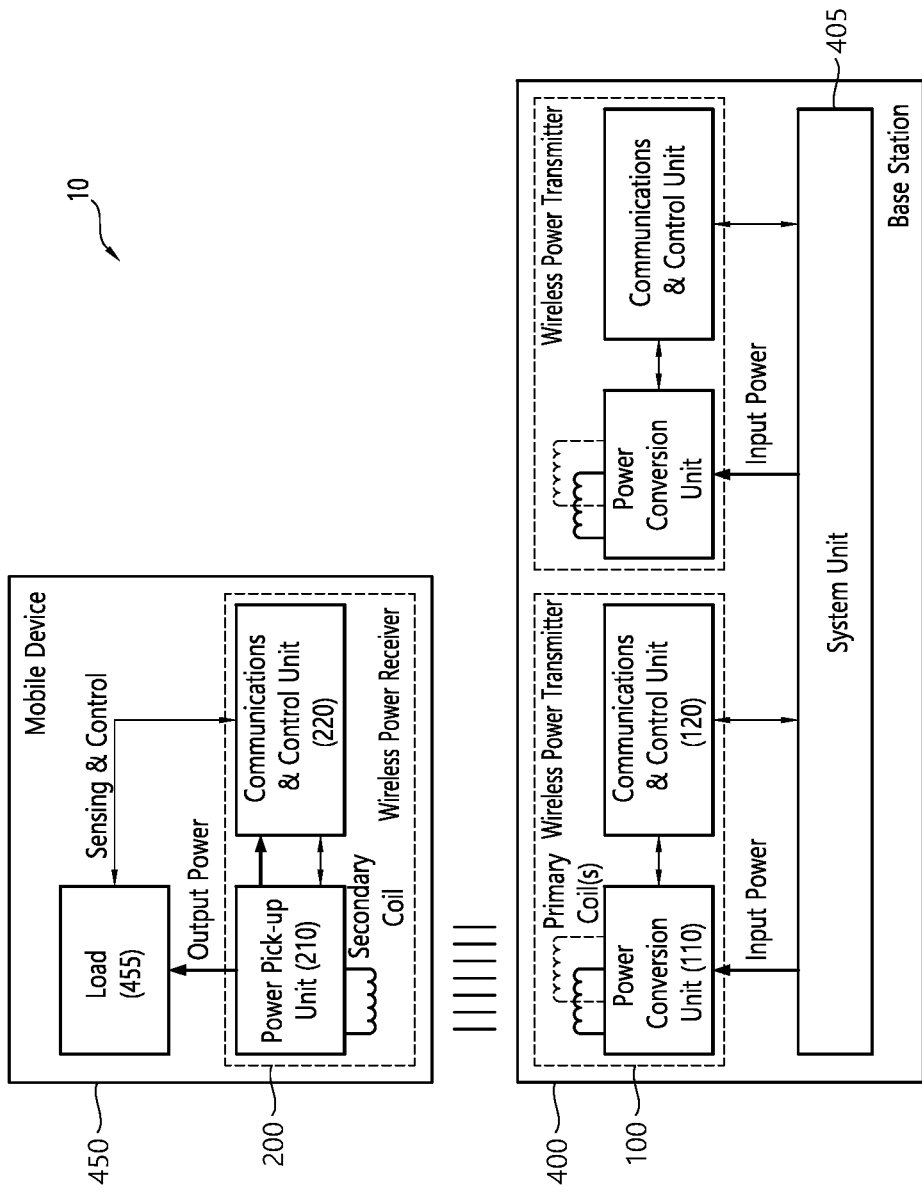

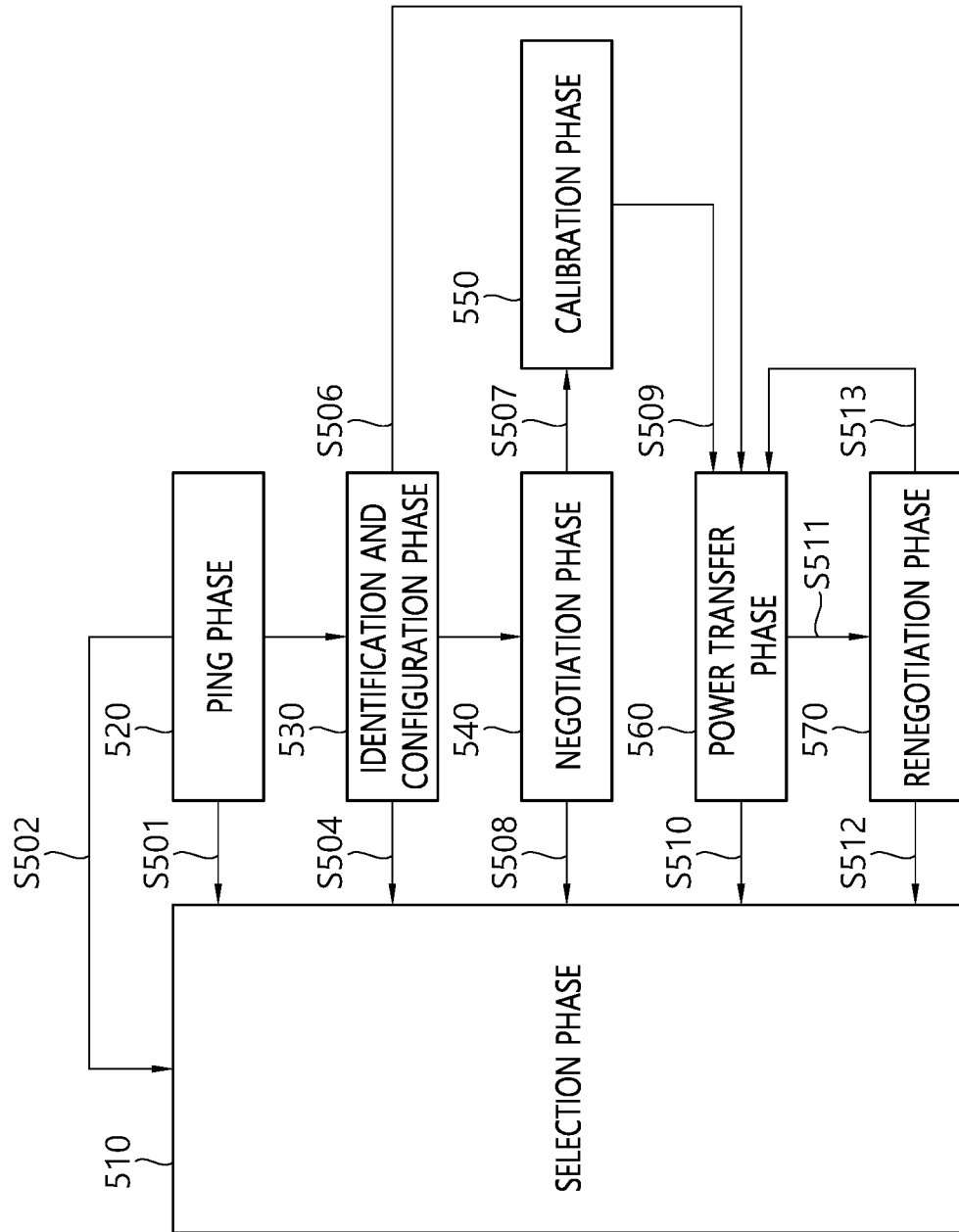

FIG. 15

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved |||||| Type ||
| $B_1$ | FOD Support Data ||||||||

FIG. 25

|  | $b_7$ | $b_6$ | $b_5$ | $b_4$ | $b_3$ | $b_2$ | $b_1$ | $b_0$ |
|---|---|---|---|---|---|---|---|---|
| $B_1$ | Reserved ||||||| Type |
| $B_2$ | First Reference Quality Factor Value ||||||||
| $B_3$ | Second Reference Quality Factor Value ||||||||
| $B_4$ | Third Reference Quality Factor Value ||||||||

WIRELESS POWER RECEPTION APPARATUS, WIRELESS POWER TRANSMISSION APPARATUS, AND FOREIGN MATTER DETECTION METHOD USING SAME

CROSS-REFERENCE TO RELATED APPLICATIONS

This application is the National Stage filing under 35 U.S.C. 371 of International Application No. PCT/KR2020/009849, filed on Jul. 27, 2020, which claims the benefit of earlier filing date and right of priority to Korean Application No. 10-2019-0090869, filed on Jul. 26, 2019, the contents of which are hereby incorporated by reference herein in their entireties.

BACKGROUND OF THE DISCLOSURE

Field of the Disclosure

The present specification relates to a wireless power transmitter, a wireless power receiver for receiving wireless power from the wireless power transmitter, and a method for detecting foreign objects between the wireless power transmitter and the wireless power receiver.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a wireless power transmitter, a wireless power receiver, and a foreign object detection method that can more accurately detect foreign objects between the wireless power transmitter and the wireless power receiver.

The technical problems of the present specification are not limited to the above-mentioned problems, and other problems not mentioned will be clearly understood by those skilled in the art from the following description.

A wireless power receiver, according to an embodiment of the present specification for solving the above problem, comprises a power pickup circuit for receiving a wireless power from a wireless power transmitter by magnetic coupling with the wireless power transmitter and a communication/control circuit for communicating with the wireless power transmitter and controlling the received wireless power, the communication/control circuit is configured to transmit, to the wireless power transmitter, information for a first reference quality factor ($Qt1'(ref)$) measured at a first frequency ($f1(ref)$) and information for a second reference quality factor ($Qt2'(ref)$) measured at a second frequency ($f2(ref)$) before entering a power transfer phase.

A wireless power transmitter, according to an embodiment of the present specification for solving the above problem, comprises a power conversion circuit for transmitting a wireless power to a wireless power receiver based on magnetic coupling with the wireless power receiver and a communication/control circuit for communicating with the wireless power receiver and controlling the transmitted wireless power, the communication/control circuit is configured to: receive, from the wireless power receiver, information for a first reference quality factor ($Qt1'(ref)$) measured at a first frequency ($f1(ref)$), information for a reference resonance frequency ($ft'(ref)$), and information for a reference quality factor ($Qt2'(ref)$) measured at a second frequency ($f2(ref)$) before entering a power transfer phase, and detect a foreign object between the wireless power transmitter and the wireless power receiver based on the information for the first reference quality factor, the information for the reference resonance frequency, and the information for the second reference quality factor.

A method for detecting a foreign object, according to an embodiment of the present specification for solving the above problem, comprises receiving information for a first reference quality factor ($Qt1'(ref)$) measured at a first frequency ($f1(ref)$), receiving information for a reference resonant frequency ($ft'(ref)$), receiving information for a second reference quality factor ($Qt2'(ref)$) measured at a second frequency ($f2(ref)$) from a wireless power receiver before entering a power transfer phase and detecting the foreign object between the wireless power transmitter and the wireless power receiver based on the information for the first reference quality factor, the information for the reference resonance frequency, and the information for the second reference quality factor.

Other specific details of the present specification are included in the detailed description and drawings.

It is possible to more accurately detect foreign substances between the wireless power transmitter and the wireless power receiver.

Effects according to the present specification are not limited by the contents exemplified above, and more various effects are included in the present specification.

BRIEF DESCRIPTION OF THE DRAWINGS

FIG. 3b shows an example of a WPC NDEF in a wireless power transfer system.

FIG. 4 is a block diagram of a wireless power transfer system according to another exemplary embodiment of the present disclosure.

FIG. 5 is a state transition diagram for describing a wireless power transfer procedure.

FIG. 15 is a diagram illustrating a format of a foreign object detection status data packet according to an embodiment.

FIG. 25 is a diagram illustrating a format of a foreign object detection status data packet according to the embodiment of FIG. 24.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
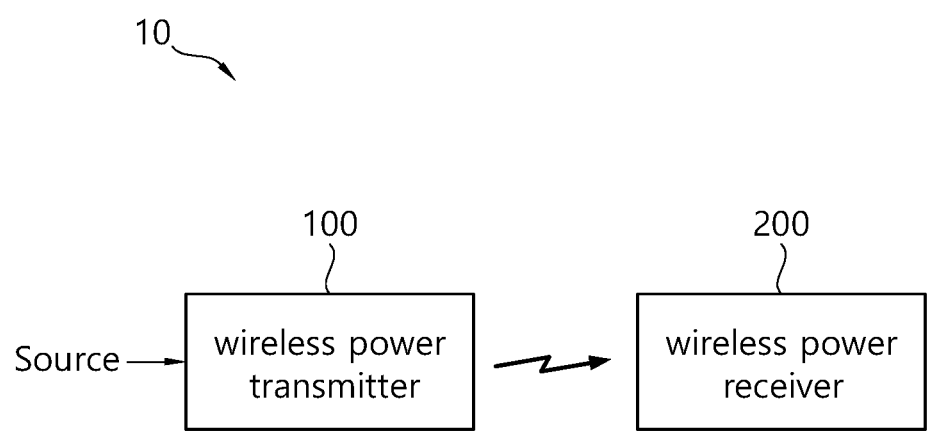
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) includes a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceiver (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
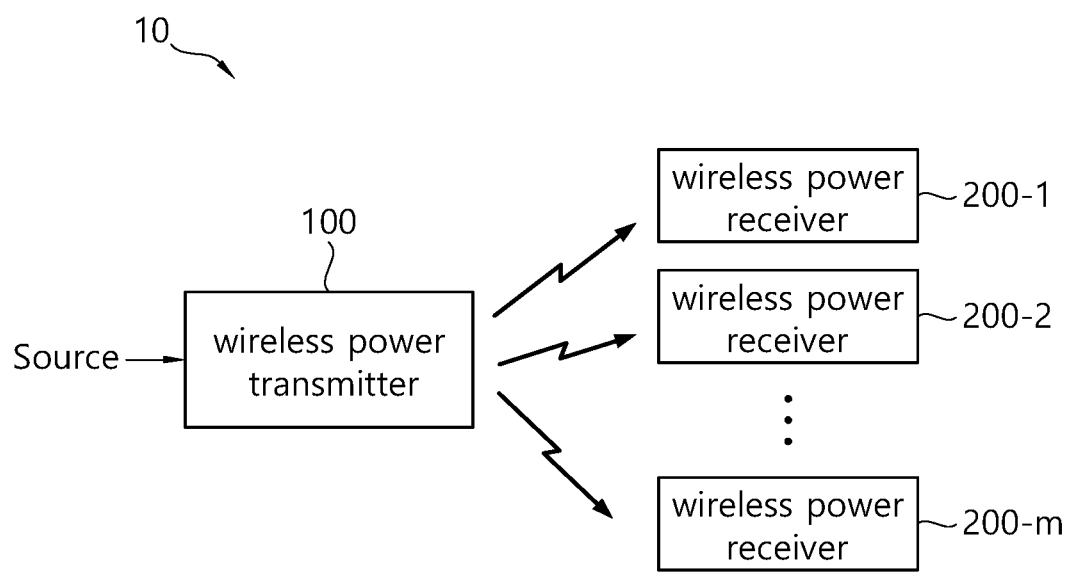
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
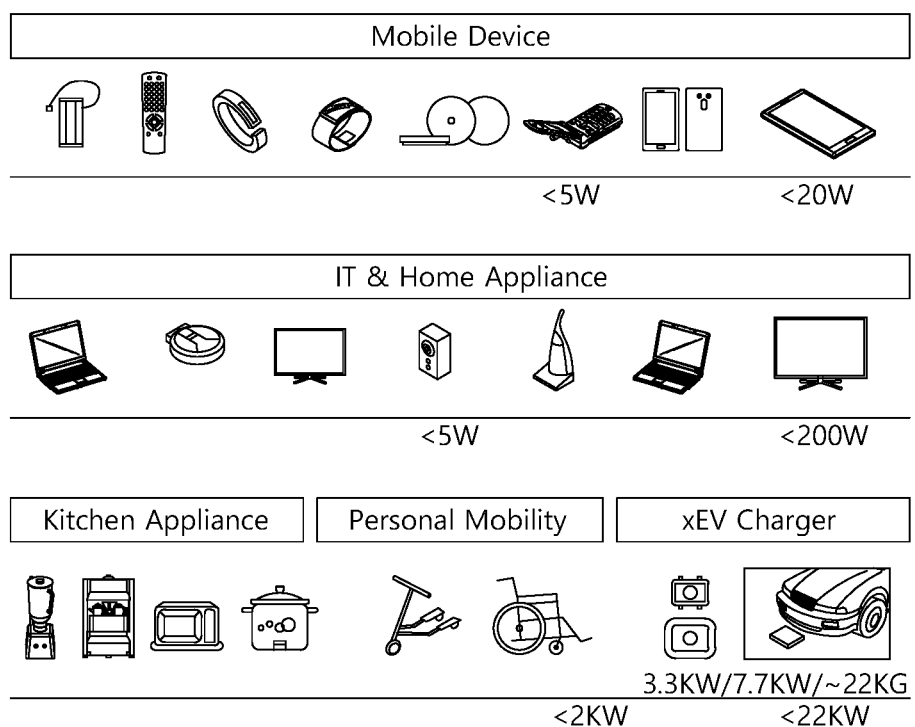
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select "Yes" to activate smart charging functions: Yes No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

FIG. 4 is a block diagram of a wireless power transfer system according to another exemplary embodiment of the present disclosure.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (TB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
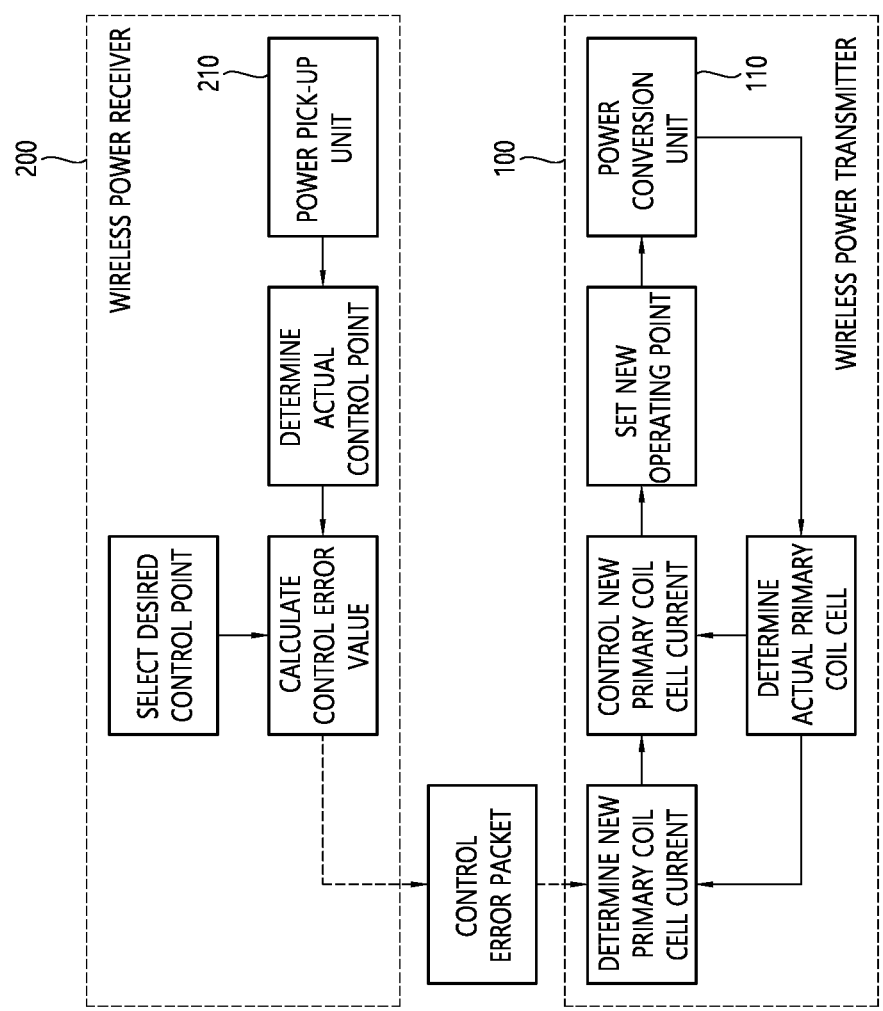
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
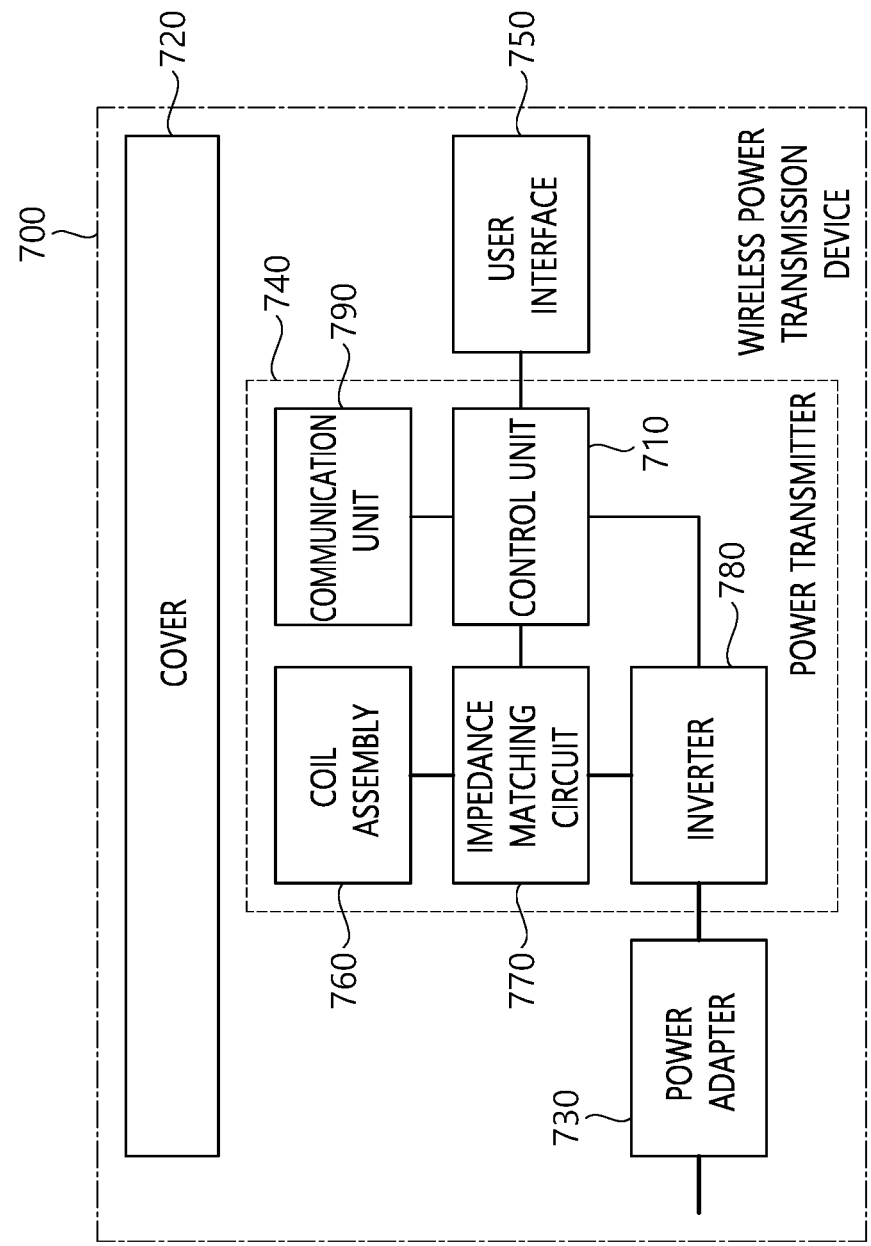
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
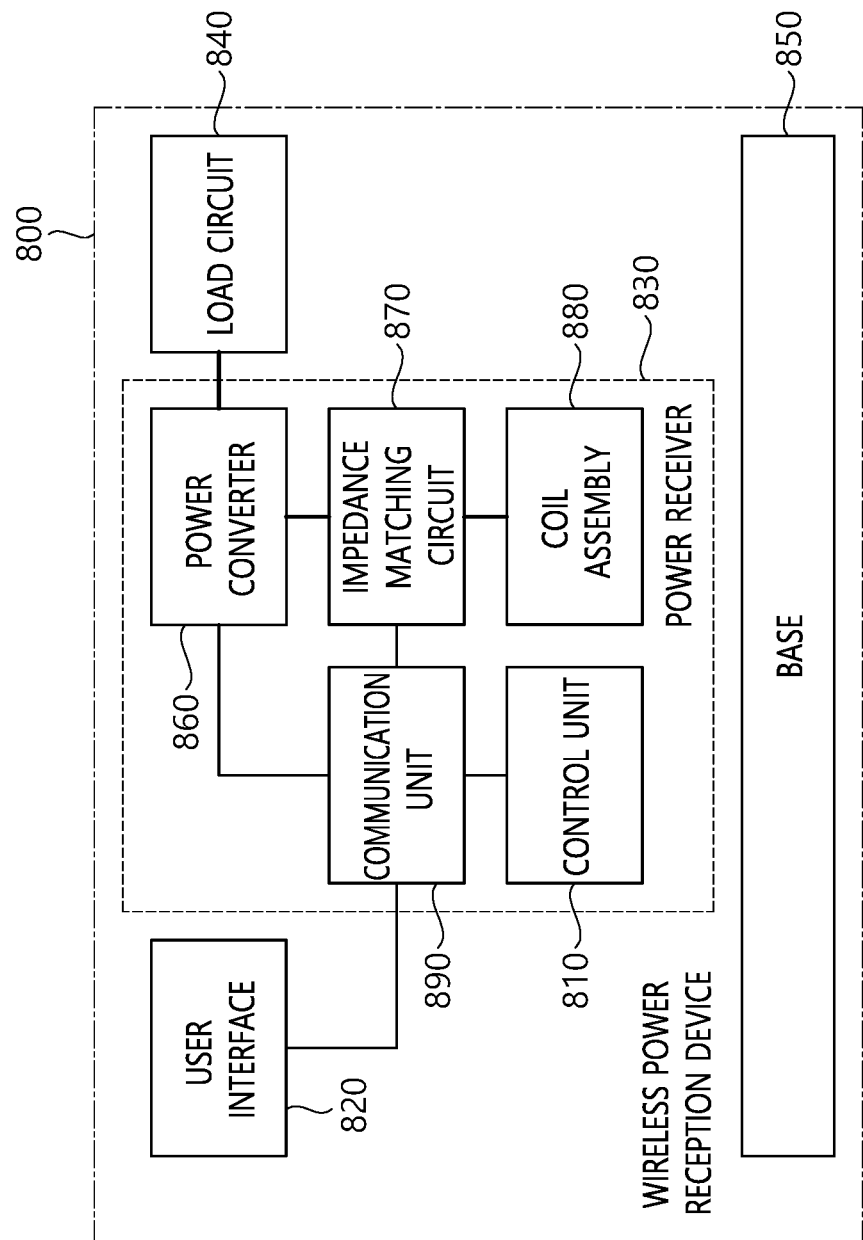
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
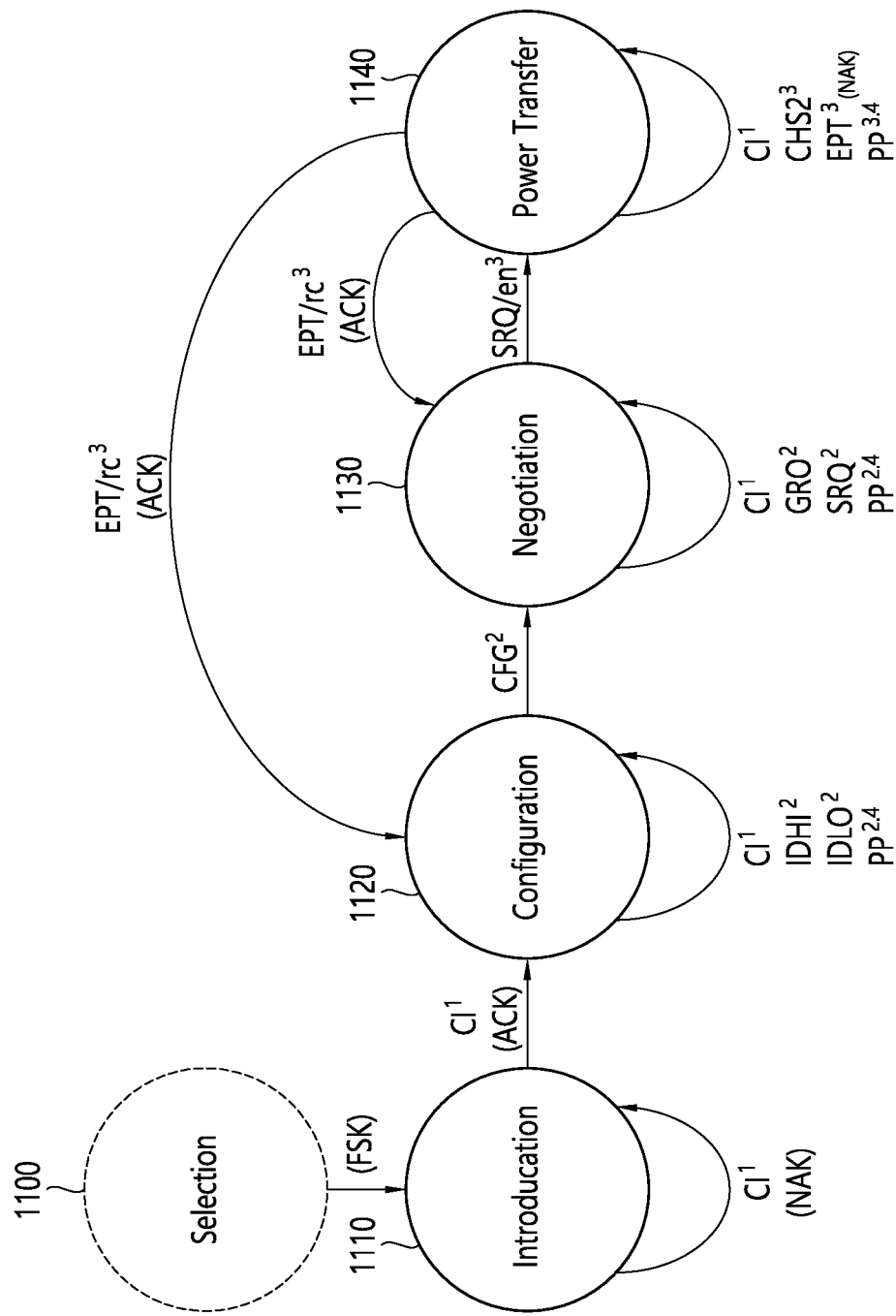
FIG. 9 shows operation statuses of a wireless power transmitter and a wireless power receiver in a shared mode according to an exemplary embodiment of the present disclosure.

FIG. 9 shows operation statuses of a wireless power transmitter and a wireless power receiver in a shared mode according to an exemplary embodiment of the present disclosure.

Referring to FIG. 9, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, foreign object detection (Pre-power transfer FOD) before power transfer between the wireless power receiver and the wireless power transmitter will be described.

As previously described in FIG. 5, before the power transfer phase (S510) (e.g., the negotiation phase (S508)), the wireless power transmitter receives FOD status data packets (FOD/qf, FOD/rf) from the wireless power receiver, and detects whether a foreign object (FO) exists between the wireless power transmitter and the wireless power receiver based on the reference quality factor value and the reference resonance frequency value included in the FOD status data packets, respectively.

In the Qi standard of WPC, a method of measuring and calculating a reference quality factor (Qt'(ref)) and a reference resonance frequency (ft'(ref)) of the wireless power receiver is defined.

According to the Qi standard of the WPC, in a state where the reference coil assembly is connected to the LCR meter and the wireless power receiver is not positioned on the reference coil assembly, and in a situation where the reference coil assembly to which a voltage of 1V (rms) is applied operates at a frequency (f(ref)) of 100±0.2 kHz, the inductance Lt(ref) and the quality factor Qt(ref) of the reference coil assembly are measured. Then, the capacitance Ct(ref) of the reference coil assembly is calculated using the measured inductance Lt(ref). Thereafter, the wireless power receiver is placed on the reference coil assembly, in a situation where the reference coil assembly to which a voltage of 1V (rms) is applied operates at a frequency (f(ref)) of 100±0.2 kHz, again, the inductance (Lt') and the quality factor (Qt') of the reference coil assembly are measured. Then, the resonance frequency (ft') is calculated using the inductance (Lt') of the reference coil assembly and the capacitance (Ct(ref)) of the reference coil assembly or the inductance (Lt(ref)) of the reference coil assembly. The measurement of the quality factor (Qt') and the calculation of the resonance frequency (ft') are repeated while alternately placing the wireless power receiver at five positions on the reference coil assembly. The five positions are the central point and the four points spaced apart from the central point in the east, west, south, north and south directions at intervals of 5 mm. The reference quality factor (Qt'(ref)) and the reference resonance frequency (ft'(ref)) of the wireless power receiver are determined by averaging the measured and calculated quality factor (Qt') and the resonance frequency (ft') at five positions.

Meanwhile, in the Qi standard of WPC, reference foreign objects are defined as in [Table 3] below.

TABLE 3

| Designator | Shape | Material | Dimensions | Limit/° C. |
|---|---|---|---|---|
| RFO#1 | Disk | Steel 1.1011DIN RFe160 | 15 mm, 1 mm thick | 60 |
| RFO#2 | Ring | DIN 3.2315EN AW-6082ISO AlSi1MgMn | 20 mm (inner) 22 mm (outer) 1 mm thick | 60 |
| RFO#3 | Foil | EN AW-1050DIN 3.0255A199.5 | 20 mm, 0.1 mm thick | 80 |
| RFO#4 | Disk | DIN 3.2315EN AW-6082ISO AlSi1MgMn | 22 mm, 1 mm thick | 60 |

On the other hand, as a result of measuring the quality factor (Q-factor) of a reference foreign object for wireless charging-capable smartphones currently sold in the market, the results shown in [Table 4] below were confirmed.

TABLE 4

| | Q-factor measured by LCR meter | | | | |
|---|---|---|---|---|---|
| Phone | w/o FO | RFO#1 | RFO#2 | RFO#3 | RFO#4 |
| None | 160 | 49.5 | 37.1 | 31 | 50 |
| A | 55 | 23.7 | 24.2 | 20 | 29 |
| B | 47 | 24.2 | 25.8 | 20.1 | 29 |
| C | 46 | 24.8 | 25 | 20 | 31 |
| D | 54 | 25.7 | 25.9 | 21.1 | 32 |
| E | 60 | 33.8 | 31.8 | 26.9 | 39.5 |
| F | 57 | 26.2 | 26.9 | 21.8 | 31 |
| G | 80 | 36 | 32.8 | 27.3 | 40.6 |
| H | 66 | 32.3 | 30 | 25.5 | 36.5 |
| I (EVM) | 106 | 33.6 | 29.1 | 24.6 | 36 |
| J (EVM) | 56 | 24.5 | 22.6 | 19.3 | 27.5 |
| K | 29 | 21.6 | 23.8 | 19.4 | 29 |
| L | 20 | 20.7 | 22.9 | 18.9 | 24 |
| M | 25 | 31.9 | 32.2 | 29.1 | 33 |

As can be seen in [Table 4], in some smartphones (L,M), the quality factor (Q-factor) measured in the presence of a foreign object was higher than the quality factor (Q-factor) measured in the absence of a foreign object (w/o FO). In this case, the wireless power transmitter that supplies wireless power to the corresponding smart phone (L, M) results in determining that there is no foreign object even if there is a foreign object.

Based on [Table 4], it can be confirmed that the above result occurs in the wireless power receiver with a low quality factor measured in the absence of a foreign object, roughly, it can be seen that the above result occurs in the wireless power receiver whose quality factor measured in the absence of a foreign object is less than 30.

Accordingly, through the PRx simulation model (Low Q PRx) with a low quality factor (Q-factor), the quality factor (Q-factor) change due to the presence of four reference foreign objects according to the change of the resonant frequency was measured.

Figure 10:
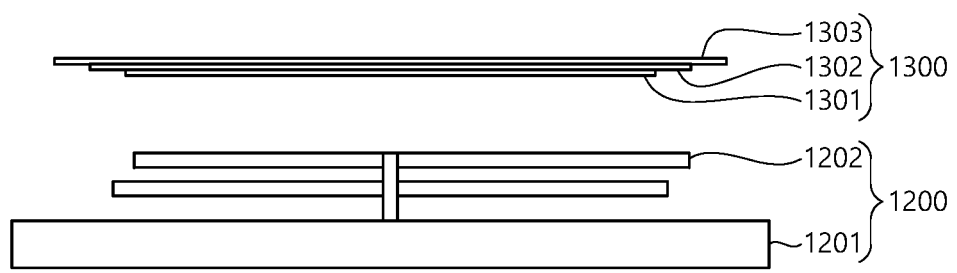
FIG. 10 is a side view of a simulation model for determining a PRx simulation model (Low Q PRx) having a low quality factor.
Figure 11:
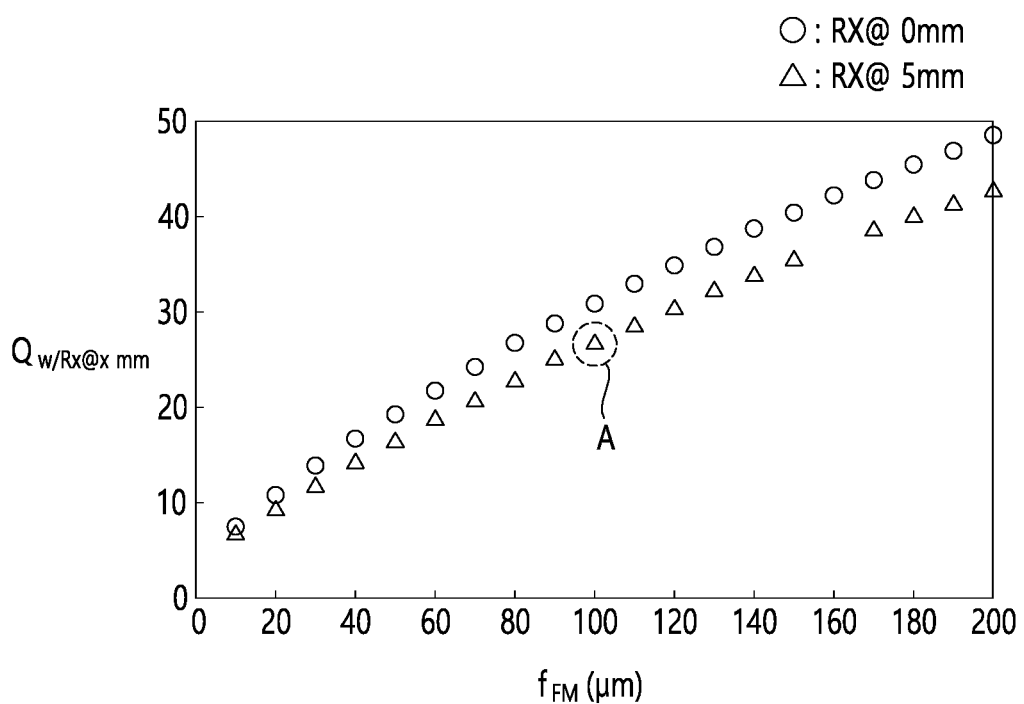
FIG. 11 is a graph showing a quality factor measurement result using the simulation model of FIG. 10.

FIG. 10 is a side view of a simulation model for determining a PRx simulation model (Low Q PRx) having a low quality factor, and FIG. 11 is a graph showing a quality factor measurement result using the simulation model of FIG. 10.

Referring to FIG. 10, the PTx simulation model 1200 models the PTx ferrite 1201 and the PTx coil 1202 according to the reference coil assembly standard according to Qi ver 1.2.3 of WPC. The PRx simulation model 1300 was configured to include a PRx coil 1301, a PRx ferrite 1302, and a friendly metal 1303. The vertical distance between the PRx coil 1301 and the PTx coil 1202 was set to be about 2.5 mm.

The PRx coil 1301, PRx ferrite 1302, and a metal-friendly material were modeled according to the specifications of [Table 5] below.

TABLE 5

| Part | Symbol | value | Unit | Physical meaning |
|---|---|---|---|---|
| Rx coil | $D_{o,Rxcoil}$ | 20.4 | mm | Outer diameter of Rx coil/2 |
| | $D_{i,Rxcoil}$ | 10 | mm | Inner diameter of Rx coil/2 |
| | $t_{Rxcoil}$ | 0.07 | mm | Thickness of Rx coil |
| | $W_{Rxcoil}$ | 0.5 | mm | width of Rx coil |
| | $P_{Rxcoil}$ | 0.3 | mm | Space between each turn of Rx coil |
| | $N_{Rxcoil}$ | 13 | Turn | The number of turn of Rx coil |
| Rx ferrite | $D_{Rx,fer}$ | 22.9 | mm | Diameter of Rx ferrite |
| | $t_{Rx,fer}$ | 0.1 | mm | Thickness of Rx ferrite |
| Friendly metal | $x_{Fm}$ | 50 | mm | x-axial length of friendly metal |
| | $Y_{FM}$ | 50 | mm | y-axial length of friendly metal |
| | $t_{FM}$ | variable | um | thickness of friendly metal |

Then, the thickness (tFM) of the friendly metal was adjusted, and the thickness (tFM) of the friendly metal, which was measured as a quality factor of 27 at a frequency of 100 kHz, was found.

Referring to FIG. 11, in a situation where the thickness (tFM) of the friendly metal is set to 100 μm, and the PTx coil 1202 and the PRx coil 1301 are offset by 5 mm in the horizontal direction, the quality factor was measured to be 27 (check area A). Therefore, the PRx simulation model (Low Q PRx) having a low quality factor is the one in which the thickness (tFM) of the friendly metal is set to 100 μm in the specification of [Table 5].

Figure 12:
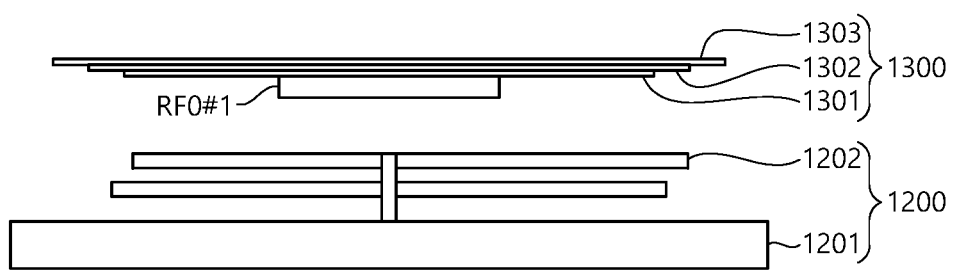
FIG. 12 is a side view showing a state in which the first reference foreign object model (RFO #1) is inserted between the PRx simulation model (Low Q PRx) and the PTx simulation model having a low quality factor.

On the other hand, FIG. 12 is a side view showing a state in which the first reference foreign object model (RFO #1) is inserted between the PRx simulation model (Low Q PRx) and the PTx simulation model having a low quality factor, and FIGS. 13a to 13d are graphs illustrating quality factor measurement results of a PRx simulation model (Low Q PRx) having a low quality factor according to a change in a resonance frequency for each type of a reference foreign object.

Referring to FIG. 12, the PRx coil 1301 and the PTx coil 1202 were positioned in the first reference foreign object model (RFO #1), the vertical distance between the first reference foreign object model (RFO #1) and the PRx coil 1301 is about 0.1 mm, and the vertical distance between the first reference foreign object model (RFO #1) and the PTx coil 1202 is about 2.5 mm.

FIG. 12 shows an example in which the first reference foreign object model (RFO #1) is positioned between the PRx simulation model (Low Q PRx, 1300) and the PTx simulation model 1200, and in a similar manner for other reference foreign object models (RFO #2, RFO #3, RFO #4), the quality factor (Q-factor) was measured by placing it in the PRx simulation model (Low Q PRx, 1300) and the PTx simulation model 1200.

Referring to FIG. 13, for each reference foreign object model (RFO #1, RFO #2, RFO #3, RFO #4), measurements were made while changing the alignment position of the PRx simulation model 1300 with respect to the PTx simulation model 1200 to four positions and changing the frequency from 100 kHz to 1000 kHz at intervals of 100 kHz.

(0, 0) is a state in which the PRx coil 1301 and the PTx coil 1202 are perfectly aligned, the quality factor related data ($\varphi$) measured at (0,0) was displayed as circular dots on the graph. (5, 0) is a state in which the PRx coil 1301 is offset by 5 mm in the X direction from the PTx coil 1202, the quality factor related data ($\varphi$) measured at (5,0) was displayed as a diamond-shaped dot on the graph. (0,5) is a state in which the PRx coil 1301 is offset by 5 mm in the Y direction than the PTx coil 1202, the quality factor related data ($\varphi$) measured at (0,5) was displayed as a triangular point on the graph. (5, 5) is a state in which the PRx coil 1301 is offset by 5 mm in the X and Y directions from the PTx coil 1202, the quality factor related data ($\varphi$) measured in (5,5) was displayed as a square dot on the graph.

$\varphi$ means the rate of change of the quality factor by the foreign object, and is defined as in [Equation 1] below.

$$\phi = (\Delta Q_{RFO}/Q_{report}) \times 100 \qquad \text{[Equation 1]}$$

$Q_{report}$ is a quality factor value that was measured in the absence of a foreign object, and is a value corresponding to the standard quality factor. $\Delta Q_{RFO}$ is a value obtained by subtracting the quality factor value measured in the absence of a foreign object from the quality factor value measured in the state in which the foreign object is inserted.

Referring to the graphs of FIGS. 13a to 13d, the quality factor change rate of the PRx simulation model (Low Q PRx, 1300) having a low quality factor at a resonance frequency of 100 kHz was measured to be the smallest. The small change rate of the quality factor means that it is difficult to distinguish the case where there is no foreign object and the case where there is a foreign object from the standpoint of the wireless power transmitter. In addition, it can be confirmed that the overall quality factor change rate is small in the fourth reference foreign object (RFO #4) among the reference foreign objects (RFO #1, RFO #2, RFO #3, RFO #4).

Considering that the standard quality factor value provided by the wireless power receiver to the wireless power transmitter through the FOD status data packet (FOD Status) should be provided with an accuracy of ±10%, for the accuracy of foreign object detection, a margin of −10% is required for the quality factor change rate.

Figure 13A:
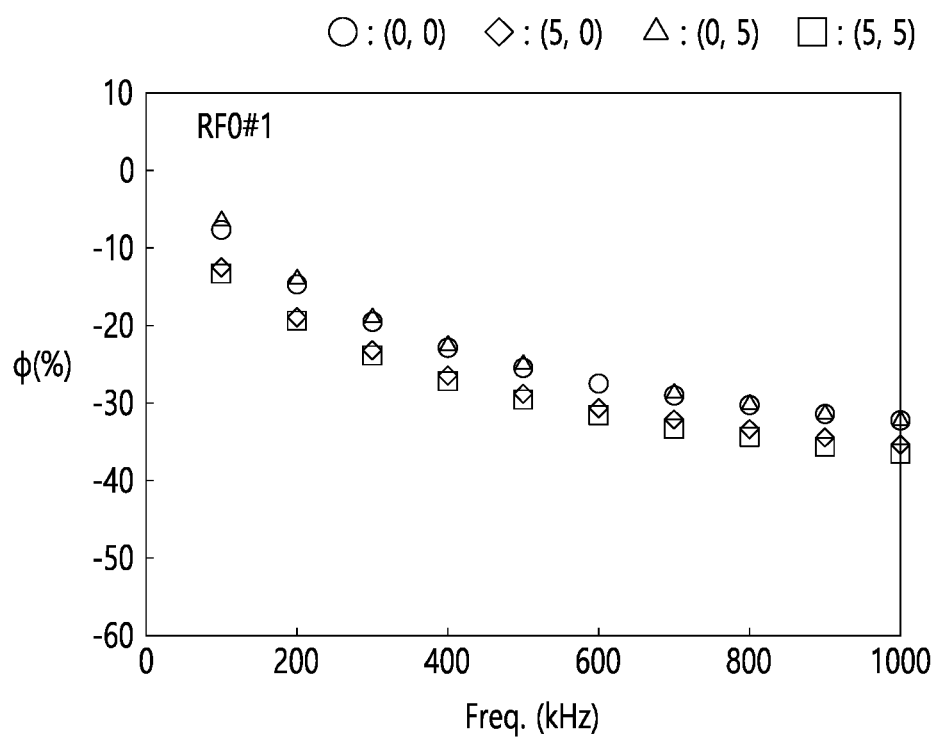
FIGS. 13a to 13d are graphs illustrating quality factor measurement results of a PRx simulation model (Low Q PRx) having a low quality factor according to a change in a resonance frequency for each type of a reference foreign object.
Figure 13B:
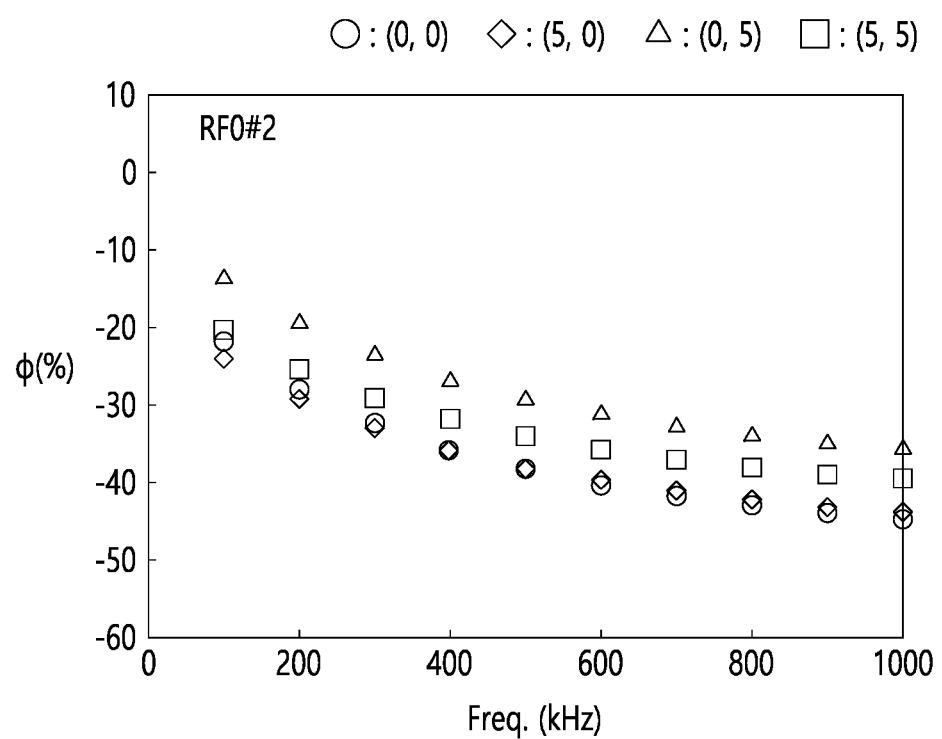
Figure 13C:
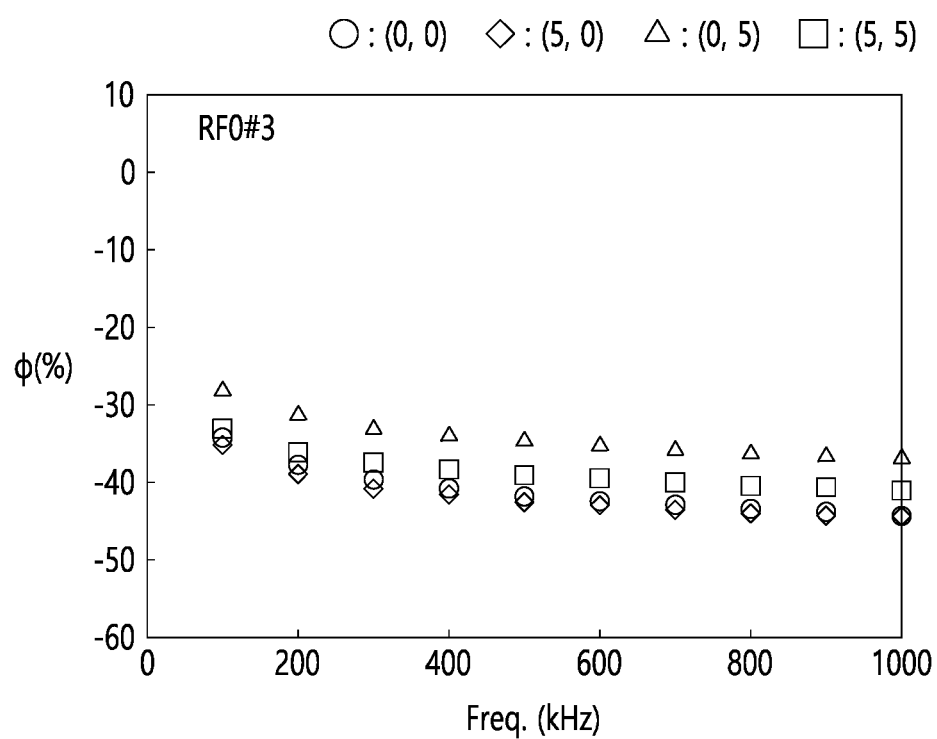
Figure 13D:
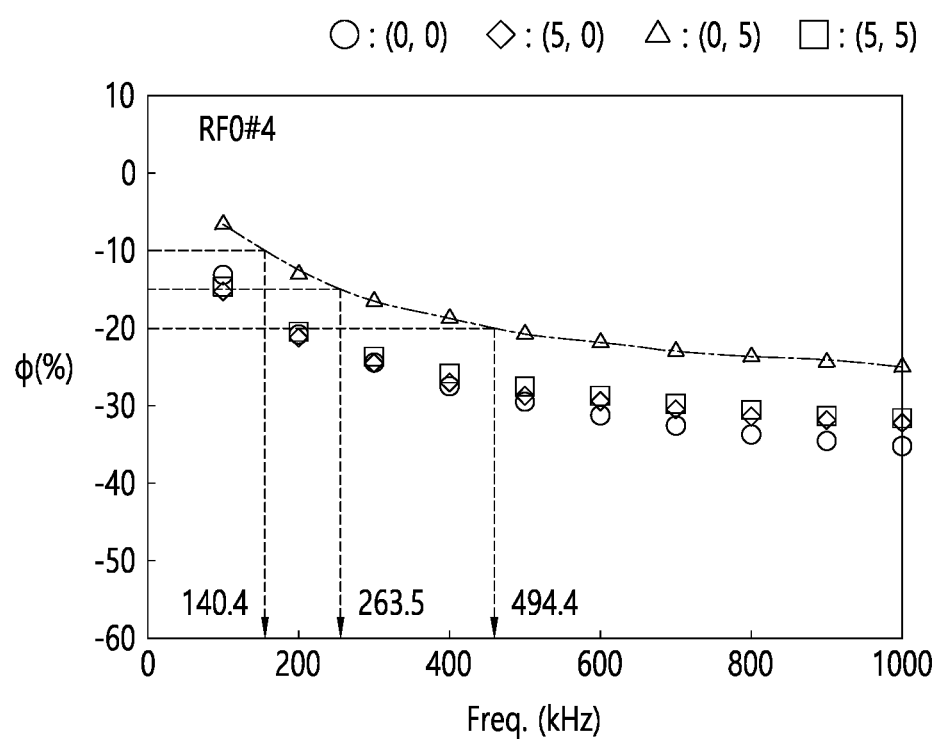

Referring to FIG. 13d, when deriving a function linking the measured quality factor change rates in the (0,5) situation with the lowest quality factor change rate in the fourth reference foreign object (RFO #4), when the quality factor change rate is −10%, the frequency becomes 140.4 kHz. And it can be seen that the absolute value of the change rate of the quality factor increases as the frequency increases. For example, the frequency when the quality factor change rate is −15% is 263.5 kHz, it can be seen that the frequency when the quality factor change rate is −20% is 494.4 kHz.

Therefore, in order for the wireless power transmitter to accurately detect a foreign object even for a wireless power receiver having a low quality factor, a reference quality factor value measured at about 140 kHz is required, in order to more accurately detect foreign objects, a reference quality factor value measured at about 300 kHz or 500 kHz is required.

Hereinafter, based on the above-described content, a more enhanced foreign object detection method will be described.

Figure 14:
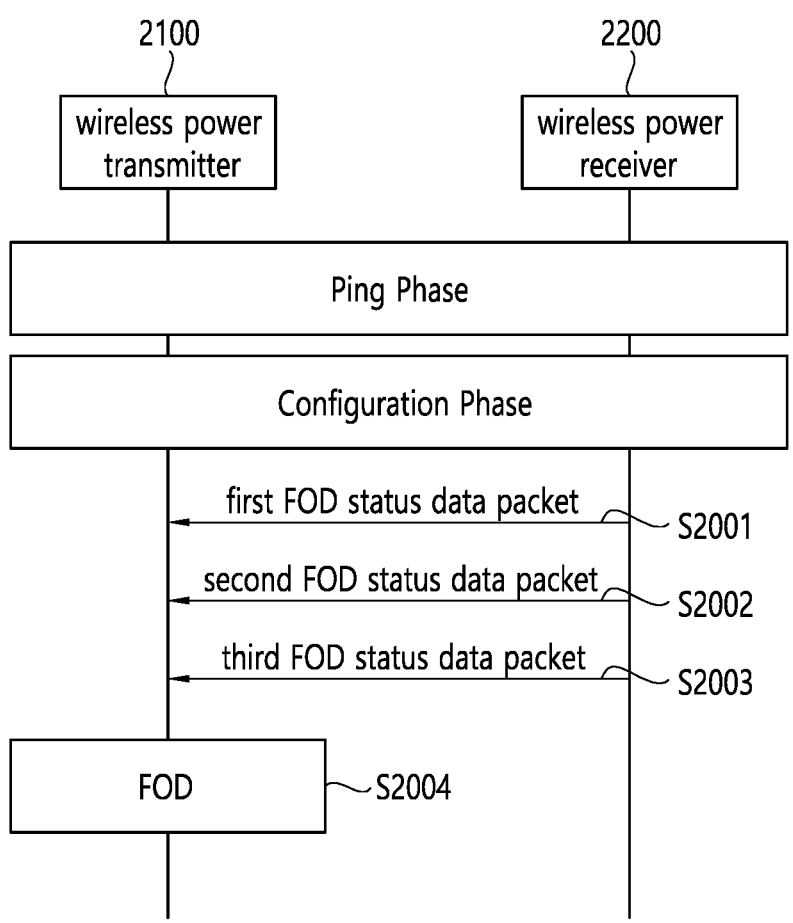
FIG. 14 is a flowchart schematically illustrating a protocol for foreign object detection before power transmission according to an embodiment.

FIG. 14 is a flowchart schematically illustrating a protocol for foreign object detection before power transmission according to an embodiment, and FIG. 15 is a diagram illustrating a format of a foreign object detection status data packet according to an embodiment.

Referring to FIG. 14, after the wireless power receiver 2100 goes through a ping phase and a configuration phase between the wireless power receiver 2100 and the wireless power transmitter 2200, it transmits a first foreign object detection status data packet (FOD Status data packet) to the wireless power transmitter 2200 (S2001), it transmits a second foreign object detection status data packet (S2002), it transmits a third foreign object detection status data packet (S2003).

The first foreign object detection status data packet includes information about the first reference quality factor (Qt1' (ref)) measured at the first frequency (f1 (ref)), the second foreign object detection status data packet includes information about a reference resonance frequency (Ft' (ref)), and the third foreign object detection status data packet includes information on the second reference quality factor Qt2'(ref) measured at the second frequency f2(ref).

The first frequency may be within a range of 100±0.2 kHz according to the current Qi standard, and the second frequency may be 140 kHz or higher.

Alternatively, the first frequency may be 140 kHz or higher, and the second frequency may be a higher frequency than the first frequency. For example, the second frequency may be about 300 kHz or about 500 kHz.

The wireless power receiver 2100 sets the value of the type field (refer to FIG. 15) of the first foreign object detection status data packet to 0 according to the current Qi standard, the wireless power receiver 2100 may set the value of the type field of the second foreign object detection status data packet to 1. In the foreign object detection support data (FOD Support Data) field of the first foreign object detection status data packet, the first reference quality factor value may be included, or a value from which the wireless power transmitter 2200 may derive the first reference quality factor value may be included. In the foreign object detection support data (FOD Support Data) field of the second foreign object detection status data packet, a reference resonant frequency value may be included, or a value from which the wireless power transmitter 2200 may derive a reference resonant frequency value may be included.

However, since the current Qi standard does not define the third foreign object detection status data packet, the wireless power receiver 2100 sets the value of the type field of the third foreign object detection status data packet to a value other than 0 and 1, it can be distinguished from the first and second foreign object detection status data packets. For example, the wireless power receiver 2100 may set the value of the type field of the third foreign object detection status data packet to 2. In the foreign object detection support data field of the third foreign object detection status data packet, a second reference quality factor value may be included, or a value from which the wireless power transmitter 2200 may derive a second reference quality factor value may be included.

The first foreign object detection status data packet and/or the third foreign object detection status data packet may further include information on a frequency at which a reference quality factor included in each packet is measured. In this case, information on the frequency at which the reference quality factor is measured may be included using a reserved field of the foreign object detection status data packet shown in FIG. 15.

Although the description has been made based on an example in which information about the first reference quality factor measured at the first frequency is included in the first foreign object detection status data packet, information on the reference resonant frequency is included in the second foreign object detection status data packet, and information on the second reference quality factor measured at the second frequency is included in the third foreign object detection status data packet. However, according to an embodiment, information on the second reference quality factor measured at the second frequency is included in the second foreign object detection status data packet and transmitted, information on the reference resonant frequency may be included and transmitted in the third foreign object detection status data packet.

The first, second, and third foreign object detection status data packets have been described based on an example using the foreign object detection status data packet defined in the current Qi standard, the present document is not limited thereto, and a new format may be defined and used.

The wireless power transmitter 2200 that has received the first, second, and third foreign object detection status data packets from the wireless power receiver 2100 performs foreign object detection (FOD) using the first reference quality factor, the reference resonance frequency, and the second reference quality factor received through the first, second, and third foreign object detection status data packets (S2004).

Figure 16:
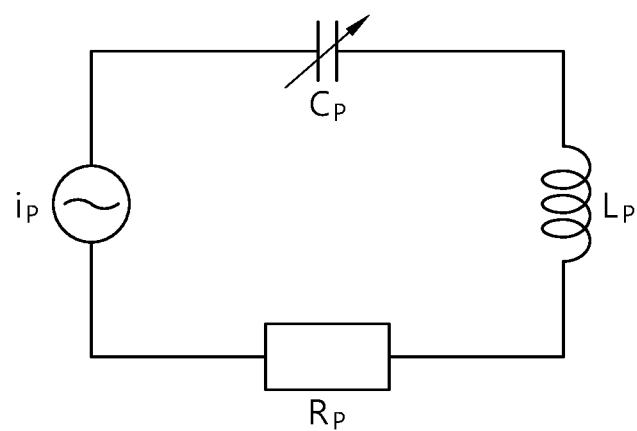
FIG. 16 is a diagram showing a circuit model schematically a wireless power transmitter according to an embodiment.
Figure 17:
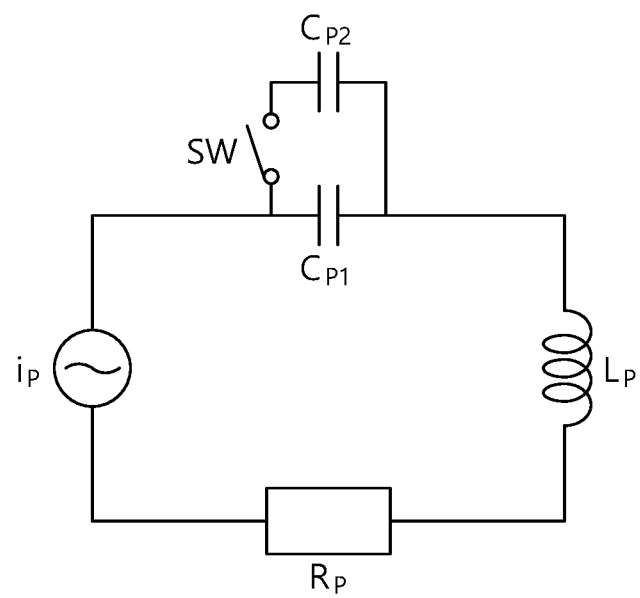
FIGS. 17 and 18 are diagrams showing a circuit model schematically illustrating a wireless power transmitter according to another embodiment.
Figure 18:
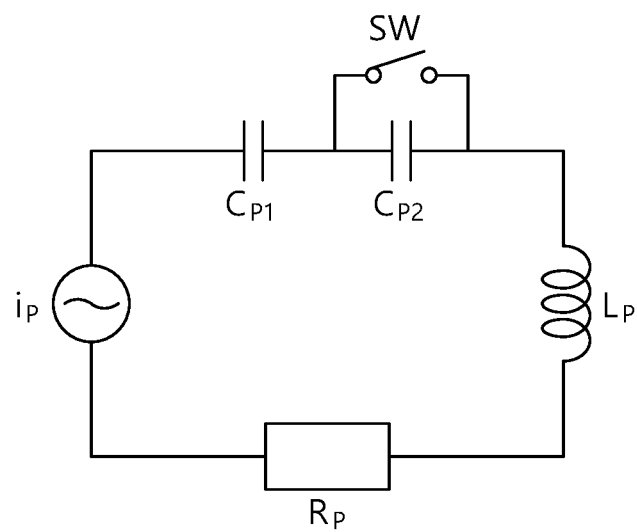
Figure 19:
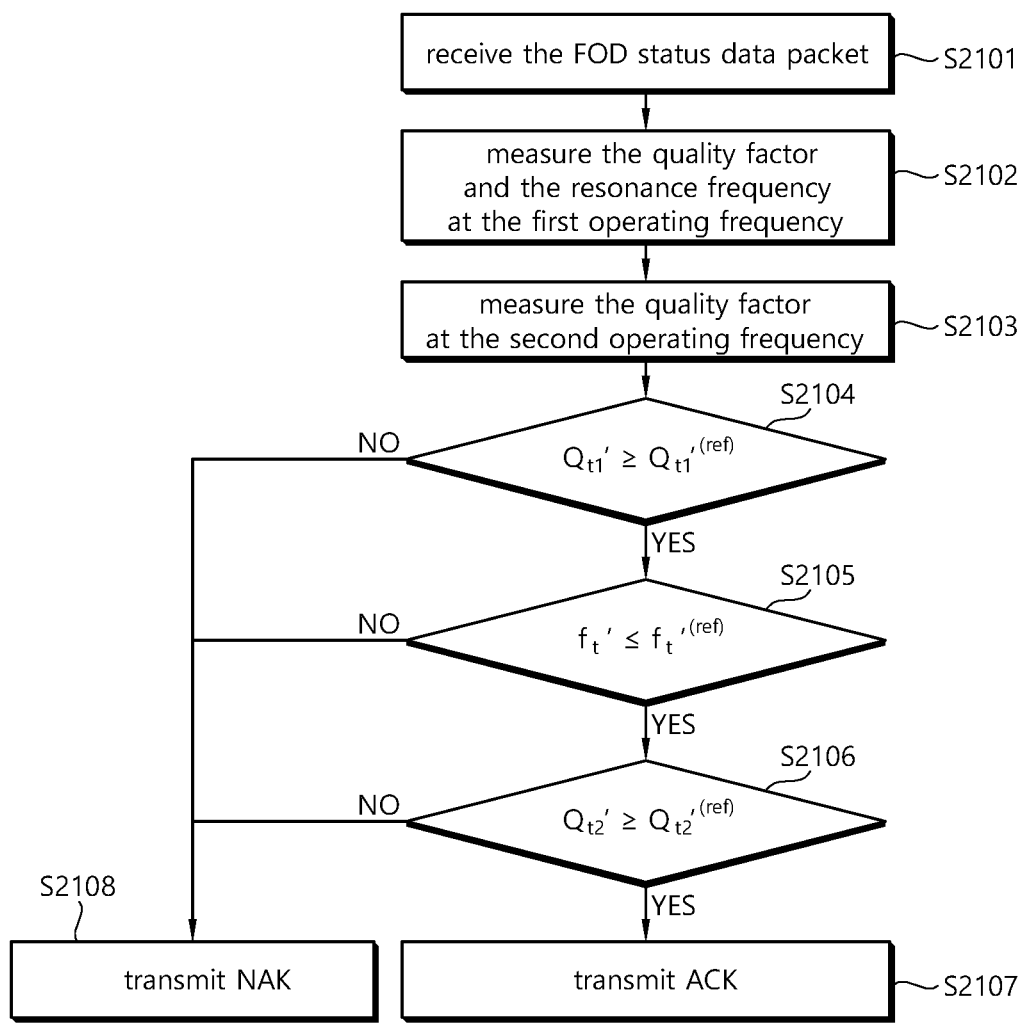
FIG. 19 is a flowchart illustrating step S2004 of FIG. 14.

FIG. 16 is a diagram showing a circuit model schematically a wireless power transmitter according to an embodiment, FIGS. 17 and 18 are diagrams showing a circuit model schematically illustrating a wireless power transmitter according to another embodiment, and FIG. 19 is a flowchart illustrating step S2004 of FIG. 14.

The wireless power transmitter 2200 must perform foreign object detection by receiving the reference quality factors measured at different frequencies (first frequency, second frequency). Accordingly, the wireless power transmitter 2200 should check the existence of a foreign object by changing the frequency, measuring the quality factor, and comparing the quality factor measured for each frequency with each reference quality factor.

Referring to FIG. 16, the wireless power transmitter 2200 includes a power conversion circuit that receives a current ($i_p$) and transmits wireless power to the wireless power receiver, and the power conversion circuit may be expressed as a circuit composed of a resistor ($R_P$), a capacitor ($C_P$), and an inductor ($L_P$).

Since the frequency of the wireless power transmitter 2200 is defined by the capacitance of the capacitor $C_P$ and the inductance of the inductor $L_P$, as shown in FIG. 16, if the capacitor $C_P$ of the wireless power transmitter 2200 is configured as a variable capacitor, the frequency may be changed.

On the other hand, referring to FIG. 17, the wireless power transmitter 2200 according to another embodiment includes two capacitors $C_{P1}$ and $C_{P2}$, one capacitor $C_{P2}$ is connected in series with the switch SW, and when the switch SW is short-circuited, the two capacitors CP1 and $C_{P2}$ are connected in parallel, when the switch SW is opened, a circuit is configured with only one capacitor $C_{P1}$ among the two capacitors $C_{P1}$ and $C_{P2}$. Accordingly, it is possible to configure the wireless power transmitter 2200 having two resonant frequencies according to the control of the switch SW.

Meanwhile, referring to FIG. 18, the wireless power transmitter 2200 according to another embodiment includes two capacitors $C_{P1}$ and $C_{P2}$, one capacitor $C_{P2}$ is connected in parallel with the switch SW, and when the switch SW is opened, the two capacitors $C_{P1}$ and $C_{P2}$ are connected in series, when the switch SW is short-circuited, a circuit is configured with only one capacitor $C_{P1}$ among the two capacitors $C_{P1}$ and $C_{P2}$. Accordingly, it is possible to configure the wireless power transmitter 2200 having two resonant frequencies according to the control of the switch SW.

Referring to FIG. 19, the wireless power transmitter 2200 receives the first, second, and third foreign object detection status data packets transmitted through steps S2001, S2002, and S2003 (S2101).

So that the power conversion circuit approaches the first frequency, the wireless power transmitter 2200 controls the capacitance of the variable capacitor of the power conversion circuit (refer to FIG. 16) or controls the switch (SW) of the power conversion circuit (See FIGS. 17 and 18).

The wireless power transmitter 2200 measures and/or calculates the quality factor ($Q_{t1}'$) and the resonance frequency ($f_t'$) when the power conversion circuit operates at the first frequency (S2102).

Then, so that the power conversion circuit approaches the second frequency, the wireless power transmitter 2200 controls the capacitance of the variable capacitor of the power conversion circuit (refer to FIG. 16), or controls the switch SW of the power conversion circuit (refer to FIGS. 17 and 18).

The wireless power transmitter 2200 measures and/or calculates the quality factor ($Q_{t2}'$) when the power conversion circuit operates at the second frequency (S2103).

The wireless power transmitter 2200 compares the quality factor ($Q_{t1}'$) measured at the first frequency with the first reference quality factor ($Q_{t1}^{(ref)}$) (S2104), compares the measured resonance frequency ($f_t'$) with the reference resonance frequency ($f_t^{(ref)}$) (S2105), compares the quality factor $Q_{t2}'$ measured at the second frequency with the second reference quality factor $Q_{t2}^{(ref)}$ (S2106).

If the quality factor ($Q_{t1}'$) measured at the first frequency is less than the first reference quality factor ($Q_{t1}^{(ref)}$), the measured resonant frequency ($f_t'$) exceeds the reference resonant frequency ($f_t^{(ref)}$), or the quality factor ($Q_{t2}'$) measured at the second frequency is less than the second reference quality factor ($Q_{t2}^{(ref)}$), the wireless power transmitter 2200 determines that there is a foreign object between the wireless power transmitter 2200 and the wireless power receiver 2100, and transmits the NAK to the wireless power receiver 2100 (S2108).

If the quality factor ($Q_{t1}'$) measured at the first frequency is greater than or equal to the first reference quality factor ($Q_{t1}'^{(ref)}$), the measured resonant frequency ($f_t'$) is less than or equal to the reference resonant frequency ($f_t'^{(ref)}$), or the quality factor ($Q_{t2}'$) measured at the second frequency is greater than or equal to the second reference quality factor ($Q_{t2}'^{(ref)}$) the wireless power transmitter 2200 determines that there is no foreign object between the wireless power transmitter 2200 and the wireless power receiver 2100, and transmits an ACK to the wireless power receiver 2100 (S2107).

Although it is shown that steps S2101 to S2106 are sequentially performed in FIG. 19, some steps may not be sequentially performed according to an embodiment. For example, the wireless power transmitter 2200 may preferentially perform any one of steps S2104, S2105, and S2106 according to information included in the foreign object detection status data packet received from the wireless power receiver 2100. More specifically, when the wireless power transmitter 2200 receives the foreign object detection status data packet including information on the first reference quality factor or reference resonant frequency, before performing step S2103, step S2104 or step S2105 may be performed.

Hereinafter, a foreign object detection method according to another embodiment will be described. For convenience of description, descriptions of parts common to the embodiment shown in FIGS. 14 to 19 will be omitted.

Figure 20:
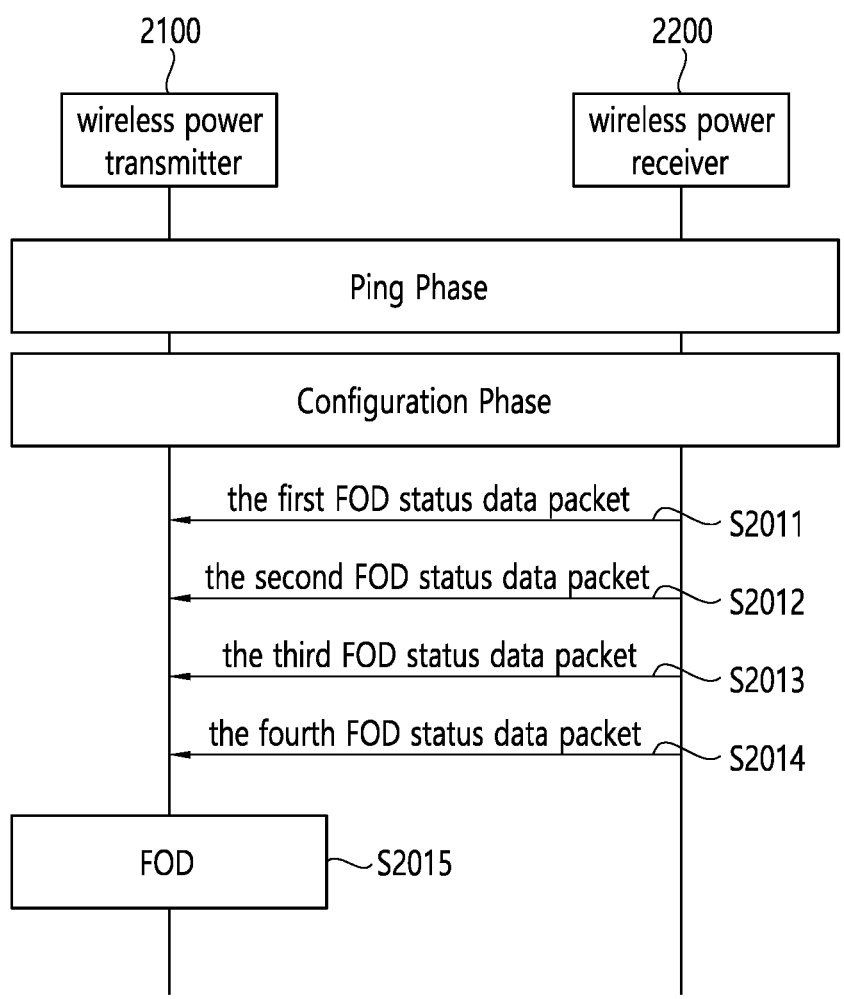
FIG. 20 is a flowchart schematically illustrating a protocol for a foreign object detection method before power transmission according to another embodiment.

FIG. 20 is a flowchart schematically illustrating a protocol for a foreign object detection method before power transmission according to another embodiment.

Referring to FIG. 20, after the wireless power receiver 2100 goes through a ping phase and a configuration phase between the wireless power receiver 2100 and the wireless power transmitter 2200, the wireless power receiver 2100 transmits a first foreign object detection status data packet (FOD Status data packet) to the wireless power transmitter 2200 (S2011), transmits a second foreign object detection status data packet (S2012), transmits a third foreign object detection status data packet, and transmits a fourth foreign object detection status data packet (S2014).

Since the description of the first, second, and third foreign object detection status data packets is common to the above-described embodiment, a description thereof will be omitted.

The fourth foreign object detection status data packet includes information about the third reference quality factor ($Q_{t3}'^{(ref)}$) measured at the third frequency ($f_3^{(ref)}$).

The first frequency may be within the range of 100±0.2 kHz according to the current Qi standard, the second frequency may be 140 kHz or higher, and the third frequency may be a higher frequency than the second frequency. For example, the second frequency may be about 140 kHz, and the third frequency may be about 300 kHz or about 500 kHz.

Or, the first frequency is 140 kHz or more, the second frequency is a frequency higher than the first frequency, and the third frequency may be a higher frequency than the second frequency. For example, the second frequency may be about 300 kHz, and the third frequency may be about 500 kHz.

Since the current Qi standard does not define the fourth foreign object detection status data packet, the wireless power receiver 2100 sets the value of the type field of the fourth foreign object detection status data packet to a value other than 0 and 1, and it can be distinguished from the first, second, and third foreign object detection status data packets. For example, the wireless power receiver 2100 may set the value of the type field of the fourth foreign object detection status data packet to 3. In the foreign object detection support data field of the fourth foreign object detection status data packet, a third reference quality factor value may be included, or a value from which the wireless power transmitter 2200 may derive a third reference quality factor value may be included.

In the fourth foreign object detection status data packet, information on a third frequency at which a third reference quality factor included in each packet is measured may be further included. In this case, information on the frequency may be included using a reserved field (Reserved) of the foreign object detection status data packet shown in FIG. 15.

The first, second, third, and fourth foreign object detection status data packets have been described based on an example of using the foreign object detection status data packet defined in the current Qi standard, but the present document is not limited thereto, and a new format may be defined and used.

The wireless power transmitter 2200 receiving the first, second, third, and fourth foreign object detection status data packets from the wireless power receiver 2100 performs foreign object detection (FOD) using the first reference quality factor, the reference resonance frequency, the second reference quality factor, and the third reference quality factor received through the 1st, 2nd, 3rd, 4th foreign object detection status data packet (S2015).

Figure 21:
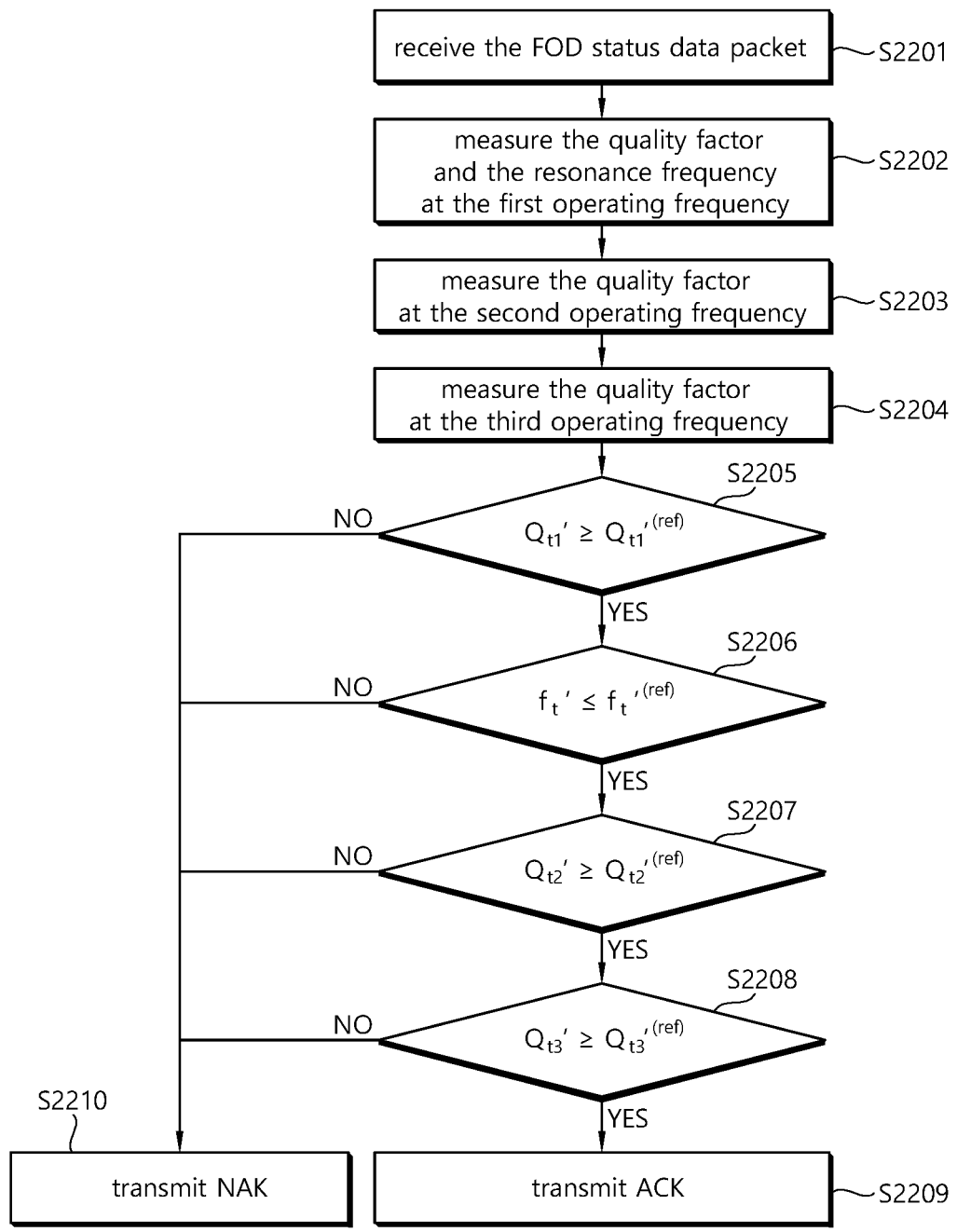
FIG. 21 is a flowchart detailing the step S2015 of FIG. 20.
Figure 22:
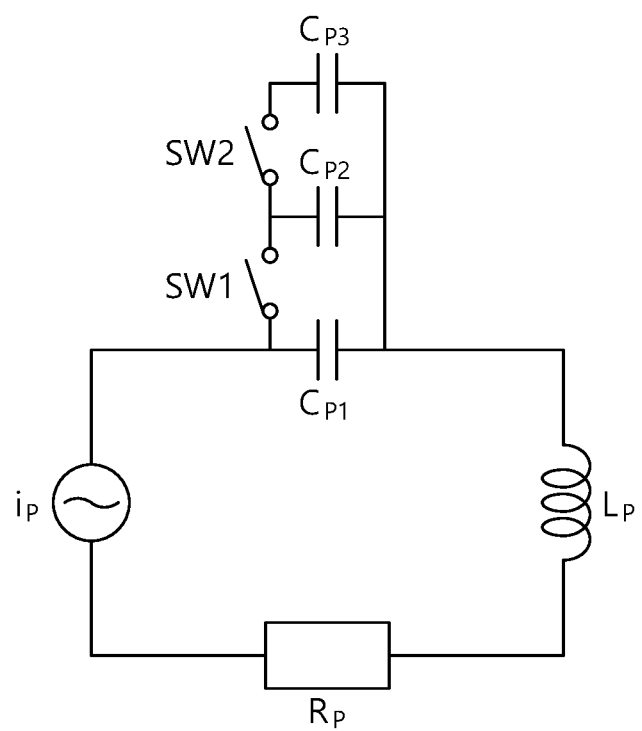
FIGS. 22 and 23 are diagrams illustrating a circuit model schematically illustrating a wireless power transmitter according to another embodiment.
Figure 23:
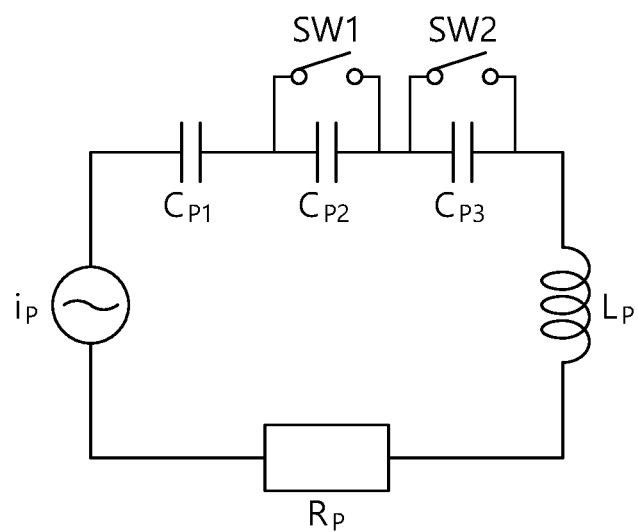

FIG. 21 is a flowchart detailing the step S2015 of FIG. 20, and FIGS. 22 and 23 are diagrams illustrating a circuit model schematically illustrating a wireless power transmitter according to another embodiment.

In this embodiment, the wireless power transmitter 2200 must perform foreign object detection by receiving the reference quality factors measured at three different frequencies (first, second, and third frequencies).

The wireless power transmitter 2200 according to FIG. 16 described above may operate at three different frequencies by adjusting the capacitance of the variable capacitor. However, FIGS. 17 and 18 can only operate at two different frequencies.

Referring to FIG. 22, the wireless power transmitter 2200 includes three capacitors ($C_{P1}$, $C_{P2}$, $C_{P3}$), and it has a circuit feature in which the second capacitor ($C_{P2}$) is connected in series with the first switch SW1, and the third capacitor ($C_{P3}$) is connected in series with the second switch SW2, two or three capacitors are connected in parallel as the first switch SW1 and the second switch SW are sequentially shorted. Accordingly, the wireless power transmitter 2200 opens the first switch SW1 and the second switch SW2 to form a circuit with only the first capacitor ($C_{P1}$), or the wireless power transmitter 2200 short-circuits the first switch SW1 and opens the second switch SW2 to configure a circuit in which the first capacitor ($C_{P1}$) and the second capacitor ($C_{P2}$) are connected in parallel, or the wireless power transmitter 2200 may short-circuit the first switch SW1 and the second switch SW2 to configure a circuit in which three capacitors ($C_{P1}$, $C_{P2}$, $C_{P3}$) are connected in parallel. Accordingly, it is possible to configure the wireless power transmitter 2200 having three resonant frequencies according to the control of the switches SW1 and SW2.

Referring to FIG. 23, the wireless power transmitter 2200 includes three capacitors ($C_{P1}$, $C_{P2}$, $C_{P3}$), it has a circuit feature in which the second capacitor ($C_{P2}$) is connected in parallel with the first switch SW1, and the third capacitor ($C_{P3}$) is connected in parallel with the second switch SW2, two or three capacitors are connected in series as the first switch SW1 and the second switch SW are sequentially shorted. Accordingly, the wireless power transmitter 2200 short-circuits the first switch SW1 and the second switch SW2 to form a circuit with only the first capacitor ($C_{P1}$), or the wireless power transmitter 2200 short-circuits any one of the first switch SW1 and the second switch SW2 to configure a circuit in which two capacitors among the three capacitors ($C_{P1}$, $C_{P2}$, $C_{P3}$) are connected in series, or the wireless power transmitter 2200 may configure a circuit in which three capacitors ($C_{P1}$, $C_{P2}$, $C_{P3}$) are connected in series by opening the first switch SW1 and the second switch SW2. Accordingly, it is possible to configure the wireless power transmitter 2200 having a maximum of four resonant frequencies according to the control of the switches SW1 and SW2.

Referring to FIG. 21, the wireless power transmitter 2200 receives the first, second, third, and fourth foreign object detection status data packets transmitted through steps S2011, S2012, S2013, and S2014 (S2201).

So that the power conversion circuit approaches the first frequency, the wireless power transmitter 2200 controls the capacitance of the variable capacitor of the power conversion circuit (refer to FIG. 16) or controls the switches SW1 and SW2 of the power conversion circuit (refer to FIGS. 22 and 23).

The wireless power transmitter 2200 measures and/or calculates the quality factor ($Q_{t1}'$) and the resonance frequency ($f_t'$) when the power conversion circuit operates at the first frequency (S2202).

Then, so that the power conversion circuit approaches the second frequency, the wireless power transmitter 2200 controls the capacitance of the variable capacitor of the power conversion circuit (refer to FIG. 16) or controls the switches SW1 and SW2 of the power conversion circuit (refer to FIGS. 22 and 23).

The wireless power transmitter 2200 measures and/or calculates the quality factor ($Q_{t2}'$) when the power conversion circuit operates at the second frequency (S2203).

Then, so that the power conversion circuit approaches the third frequency, the wireless power transmitter 2200 controls the capacitance of the variable capacitor of the power conversion circuit (refer to FIG. 16) or controls the switches SW1 and SW2 of the power conversion circuit (refer to FIGS. 22 and 23).

The wireless power transmitter 2200 measures and/or calculates the quality factor ($Q_{t3}'$) when the power conversion circuit operates at the third frequency (S2204).

The wireless power transmitter 2200 compares the quality factor ($Q_{t1}'$) measured at the first frequency with the first reference quality factor ($Q_{t1}'^{(ref)}$) (S2205), compares the measured resonant frequency ($f_t'$) with the reference resonant frequency ($f_t'^{(ref)}$) (S2206), compares the quality factor ($Q_{t2}'$) measured at the second frequency with the second reference quality factor ($Q_{t2}'^{(ref)}$) (S2207), and compares the quality factor ($Q_{t3}'$) measured at the third frequency with the third reference quality factor ($Q_{t3}'^{(ref)}$) (S2208).

The quality factor ($Q_{t1}'$) measured at the first frequency is less than the first reference quality factor ($Q_{t1}'^{(ref)}$), or the measured resonant frequency ($f_t'$) exceeds the reference resonant frequency ($f_t'^{(ref)}$), or the quality factor ($Q_{t2}'$) measured at the second frequency is less than the second reference quality factor ($Q_{t2}'^{(ref)}$), or the quality factor ($Q_{t2}'$) measured at the third frequency is less than the third reference quality factor ($Q_{t3}'^{(ref)}$), the wireless power transmitter 2200 determines that there is a foreign object between the wireless power transmitter 2200 and the wireless power receiver 2100, and transmits the NAK to the wireless power receiver 2100 (S2210).

If the quality factor ($Q_{t1}'$) measured at the first frequency is greater than or equal to the first reference quality factor ($Q_{t1}'^{(ref)}$), the measured resonant frequency ($f_t'$) is less than or equal to the reference resonant frequency ($f_t'^{(ref)}$), the quality factor ($Q_{t2}'$) measured at the second frequency is greater than or equal to the second reference quality factor ($Q_{t2}'^{(ref)}$), and the quality factor ($Q_{t3}'$) measured at the third frequency is greater than or equal to the third reference quality factor ($Q_{t3}'^{(ref)}$), the wireless power transmitter 2200 determines that there is no foreign object between the wireless power transmitter 2200 and the wireless power receiver 2100, and transmits an ACK to the wireless power receiver 2100 (S2209).

In FIG. 21, steps S2201 to S2208 are shown to be sequentially performed, but some steps may not be sequentially performed according to an embodiment. For example, the wireless power transmitter 2200 may preferentially proceed to any one of steps S2205 to S2208 according to information included in the foreign object detection status data packet received from the wireless power receiver 2100. More specifically, when the wireless power transmitter 2200 receives a foreign object detection status data packet including information on the first reference quality factor or reference resonant frequency, before performing steps S2203 and/or S2204, S2205 or Step S2206 may be performed. Also, when the wireless power transmitter 2200 receives the foreign object detection status data packet including information in the second reference quality factor, step S2207 may be performed before step S2208 is performed.

In the embodiment according to FIGS. 14 to 19, a method for the wireless power transmitter 2200 to receive two reference quality factors from the wireless power receiver 2100 and use them to perform foreign object detection (FOD) has been described, and in the embodiment according to FIGS. 20 to 23, a method has been described in which the wireless power transmitter 2200 receives three reference quality factors from the wireless power receiver 2100 and performs foreign object detection (FOD) using them.

Expanding from the above embodiment, a method in which the wireless power transmitter 2200 receives four or more reference quality factors from the wireless power receiver 2100 and performs foreign object detection (FOD) using them is also possible.

That is, the wireless power transmitter 2200 may be configured to selectively connect a plurality of capacitors in series or parallel using a variable capacitor or a plurality of switches to operate at four or more frequencies.

However, according to the current Qi standard, since the Type field of the foreign object detection status data packet consists of 2 bits, in order to transmit four or more reference quality factors to be distinguished from each other, either the reserved field of the existing foreign object detection status data packet is used, or a new format foreign object detection status data packet is required.

Hereinafter, a foreign object detection method according to another embodiment will be described. For convenience of description, descriptions of parts common to the embodiment according to FIGS. 14 to 19 and/or the embodiment according to FIGS. 20 to 23 will be omitted.

Figure 24:
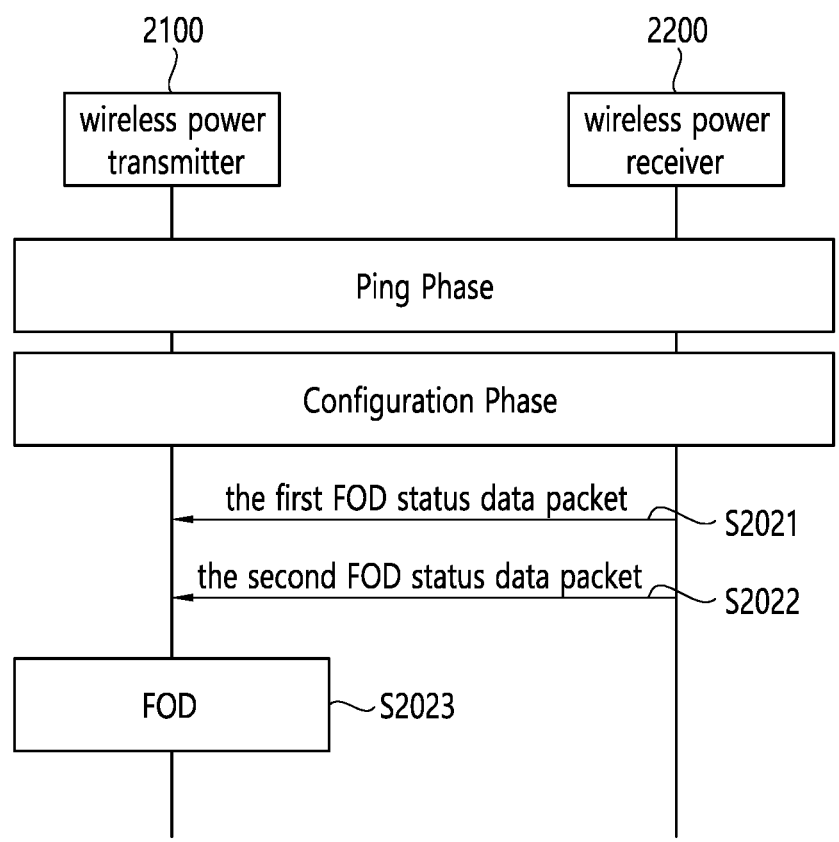
FIG. 24 is a flowchart schematically showing a protocol for a foreign object detection method before power transmission according to another embodiment.

FIG. 24 is a flowchart schematically showing a protocol for a foreign object detection method before power transmission according to another embodiment, FIG. 25 is a diagram illustrating a format of a foreign object detection status data packet according to the embodiment of FIG. 24.

Referring to FIG. 24, after the wireless power receiver 2100 goes through a ping phase and a configuration phase between the wireless power receiver 2100 and the wireless power transmitter 2200, the wireless power receiver 2100 transmits a first foreign object detection status data packet (FOD Status data packet) to the wireless power transmitter 2200 (S2021) and transmits a second foreign object detection status data packet (S2022).

The first foreign object detection status data packet includes information about a plurality of reference quality factors measured at different frequencies, and the second foreign object detection status data packet includes information on a reference resonance frequency ($f_t^{(ref)}$).

The wireless power receiver 2100 may set the value of the type field of the first foreign object detection status data packet to 0, and set the value of the type field of the second foreign object detection status data packet to 1.

Referring to FIG. 25, a foreign object detection status data packet (FOD Status data packet) is 3 bytes or more. That is, in this embodiment, since information on a plurality of reference quality factors measured at different frequencies is transmitted in one foreign object detection status data packet, the foreign object detection status data packet consists of 3 bytes or more.

As shown in FIG. 25, when the wireless power receiver 2100 transmits information on three reference quality factors, the foreign object detection status data packet may consist of 4 bytes. As another example, when the wireless power receiver 2100 transmits information on four reference quality factors, the foreign object detection status data packet may consist of 5 bytes. That is, the format of the foreign object detection status data packet may be set differently or variably according to the number of reference quality factors that the wireless power receiver 2100 can transmit.

As described above, according to the present specification, since foreign object detection is performed using the reference quality factor measured at a frequency of 140 kHz or higher, it is possible to more accurately detect a foreign object even for a wireless power receiver with a low quality factor.

The wireless power transmitter in the embodiment according to the above-described FIGS. 10 to 25 corresponds to the wireless power transmission device or the wireless power transmitter or the power transmission unit disclosed in FIGS. 1 to 9. Accordingly, the operation of the wireless power transmitter in this embodiment is implemented by one or a combination of two or more of each component of the wireless power transmitter in FIGS. 1 to 9. For example, reception of a data packet for foreign object detection by the wireless power transmitter, execution of a foreign object detection method, and transmission of ACK/NAK according to the foreign object detection result may be performed by the communication/control circuit 120.

In addition, the wireless power receiver in the embodiment according to FIGS. 10 to 25 corresponds to the wireless power reception device or the wireless power receiver or the power reception unit disclosed in FIGS. 1 to 9. Accordingly, the operation of the wireless power receiver in this embodiment is implemented by one or a combination of two or more of the respective components of the wireless power receiver in FIGS. 1 to 9. For example, transmission of a data packet for foreign object detection by the wireless power receiver and reception of ACK/NAK according to a foreign object detection result may be performed by the communication/control unit 220.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each of the above-described components or steps is not necessarily performed in the order described, and it is also possible that the steps described later are performed before the steps described earlier.

The above description is merely illustrative of the technical idea of the present document, those of ordinary skill in the art to which the present document pertains will be able to make various modifications and variations without departing from the essential characteristics of the present document. Accordingly, the embodiments of the present document described above may be implemented separately or in combination with each other.

Accordingly, the embodiments disclosed in the present document are not intended to limit the technical spirit of the present document, but to explain, and the scope of the technical spirit of the present document is not limited by these embodiments. The protection scope of the present document should be construed by the following claims, all technical ideas within the scope equivalent thereto should be construed as being included in the scope of the present document.

What is claimed is:

1. A wireless power receiver, comprising:
a power pickup circuit for receiving a wireless power from a wireless power transmitter by magnetic coupling with the wireless power transmitter; and
a communication/control circuit for communicating with the wireless power transmitter and controlling the received wireless power,
wherein the wireless power receiver is configured to:
transmit, to the wireless power transmitter, in a negotiation phase, a first foreign object detection (FOD) status data packet,
wherein the first FOD status data packet includes:
a type information having a value '0', information for a first reference quality factor measured at a first frequency, and
information for the first frequency;
transmit, to the wireless power transmitter in the negotiation phase, a second FOD status data packet,
wherein the second FOD status data packet includes:
a type information having a value '1', and
information for a reference resonance frequency;
transmit, to the wireless power transmitter in the negotiation phase, a third FOD status data packet,
wherein the third FOD status data packet includes:
a type information having a different value from the value '0' and the value '1',
information for a second reference quality factor measured at a second frequency, and
information for the second frequency;
receive, from the wireless power transmitter in the negotiation phase, a response based on the first FOD status data packet, the second FOD status data packet and the third FOD status data packet,
wherein the second frequency is a frequency higher than the first frequency within operating frequency.

2. The wireless power receiver of claim 1, wherein the second frequency is 300 kHz or 500 kHz.

3. A wireless power transmitter, comprising:
a power conversion circuit for transmitting a wireless power to a wireless power receiver based on magnetic coupling with the wireless power receiver; and
a communication/control circuit for communicating with the wireless power receiver and controlling the transmitted wireless power,
wherein the wireless power transmitter is configured to:
receive, from the wireless power receiver in a negotiation phase, a first foreign object detection (FOD) status data packet,
wherein the first FOD status data packet includes:
a type information having a value '0', information for a first reference quality factor measured at a first frequency, and
information for the first frequency;
receive, from the wireless power receiver in the negotiation phase, a second FOD status data packet,
wherein the second FOD status data packet includes:
a type information having a value '1', and
information for a reference resonance frequency;
receive, from the wireless power receiver in the negotiation phase, a third FOD status data packet,
wherein the third FOD status data packet includes:
a type information having a different value from the value '0' and the value '1',
information for a second reference quality factor measured at a second frequency, and
information for the second frequency;
transmit, to the wireless power receiver in the negotiation phase, a response based on the first FOD status data packet, the second FOD status data packet and the third FOD status data packet,
wherein the second frequency is a frequency higher than the first frequency within operating frequency.

4. The wireless power transmitter of claim 3, wherein the second frequency is 300 kHz or 500 kHz.

5. A method for detecting a foreign object, the method performed by a wireless power transmitter and comprising:
receiving, from a wireless power receiver in a negotiation phase, a first foreign object detection (FOD) status data packet,
wherein the first FOD status data packet includes:
a type information having a value '0', information for a first reference quality factor measured at a first frequency, and
information for the first frequency;
receiving, from the wireless power receiver in the negotiation phase, a second FOD status data packet,
wherein the second FOD status data packet includes:
a type information having a value '1', and
information for a reference resonance frequency;
receiving, from the wireless power receiver in the negotiation phase, a third FOD status data packet,
wherein the third FOD status data packet includes:
a type information having a different value from the value '0' and the value '1',
information for a second reference quality factor measured at a second frequency, and
information for the second frequency;
transmitting, to the wireless power receiver in the negotiation phase, a response based on the first FOD status data packet, the second FOD status data packet and the third FOD status data packet,
wherein the second frequency is a frequency higher than the first frequency within operating frequency.

6. The method of claim 5, wherein the second frequency is 300 kHz or 500 kHz.

* * * * *